(12) United States Patent
Eakin et al.

(10) Patent No.: US 12,488,798 B1
(45) Date of Patent: Dec. 2, 2025

(54) CONTINUOUS LEARNING FOR MACHINE LEARNING MODELS

(71) Applicant: Amazon Technologies, Inc., Seattle, WA (US)

(72) Inventors: Aaron Eakin, Seattle, WA (US); Ariya Rastrow, Seattle, WA (US); James Garnet Droppo, Carnation, WA (US); Gurpreet Singh Chadha, Seattle, WA (US); Pankaj Sitpure, San Jose, CA (US); Buddha Puneeth Nandanoor, Milpitas, CA (US); Santosh Kumar Patro, Lynnwood, WA (US); Milind Mukesh Rao, Sunnyvale, CA (US); Gopinath Chennupati, Santa Cara, CA (US); Andrew Oberlin, Lynnwood, WA (US); Prahalad Venkataramanan, Bellevue, WA (US); Frederick Weber, Bangalore, IN (US); Venkata Kishore Nandury, Hyderabad, IN (US); Anand Mohan, Hyderabad, IN (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 17/852,552

(22) Filed: Jun. 29, 2022

Related U.S. Application Data

(60) Provisional application No. 63/350,287, filed on Jun. 8, 2022.

(51) Int. Cl.
*G10L 15/26* (2006.01)
*G06N 3/045* (2023.01)
*G06N 3/096* (2023.01)
*G10L 21/10* (2013.01)

(52) U.S. Cl.
CPC .............. *G10L 15/26* (2013.01); *G06N 3/045* (2023.01); *G10L 21/10* (2013.01)

(58) Field of Classification Search
CPC .......... G10L 15/26; G10L 21/10; G06N 3/045
See application file for complete search history.

(56) References Cited

U.S. PATENT DOCUMENTS

| | | | | |
|---|---|---|---|---|
| 10,210,860 B1 * | 2/2019 | Ward | ...................... | G06N 3/044 |
| 10,872,599 B1 * | 12/2020 | Wu | ......................... | G10L 15/08 |
| 10,964,315 B1 * | 3/2021 | Wu | ......................... | G10L 15/16 |
| 11,211,058 B1 * | 12/2021 | Eakin | ..................... | G10L 15/197 |

(Continued)

*Primary Examiner* — Daniel C Washburn
*Assistant Examiner* — Penny L Caudle
(74) *Attorney, Agent, or Firm* — Pierce Atwood LLP

(57) ABSTRACT

A first neural network (NN) model may generate labels for training a second NN model. The second NN model may represent instances of a NN model operating on multiple different devices (e.g., decentralized user and/or edge devices). The system may include using a "teacher" model to process data received by one or more of the devices to generate a labeled dataset. The system may use the labeled dataset and a "student" model to calculate gradient data for updating the student model. The student model may be the same or similar to NN model instances operating on the devices. The system may validate the updated student model to determine, for example, whether it exhibits improved performance when processing the newly received data and/or historical data. The system may distribute the validated update to the devices.

22 Claims, 12 Drawing Sheets

(56) References Cited

U.S. PATENT DOCUMENTS

| | | | | |
|---|---|---|---|---|
| 2003/0187642 | A1* | 10/2003 | Ponceleon | G10L 15/1822 |
| | | | | 704/252 |
| 2016/0267903 | A1* | 9/2016 | Kapralova | G10L 15/30 |
| 2020/0327457 | A1* | 10/2020 | Cmielowski | G06N 20/20 |
| 2022/0122586 | A1* | 4/2022 | Yu | G10L 15/30 |

* cited by examiner

CONTINUOUS LEARNING FOR MACHINE LEARNING MODELS

CROSS REFERENCE TO RELATED APPLICATION

This application claims the benefit of priority of U.S. Provisional Patent Application No. 63/350,287 filed Jun. 8, 2022, and titled "CONTINUOUS LEARNING FOR MACHINE LEARNING MODELS," in the names of Aaron Eakin, et al., the content of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
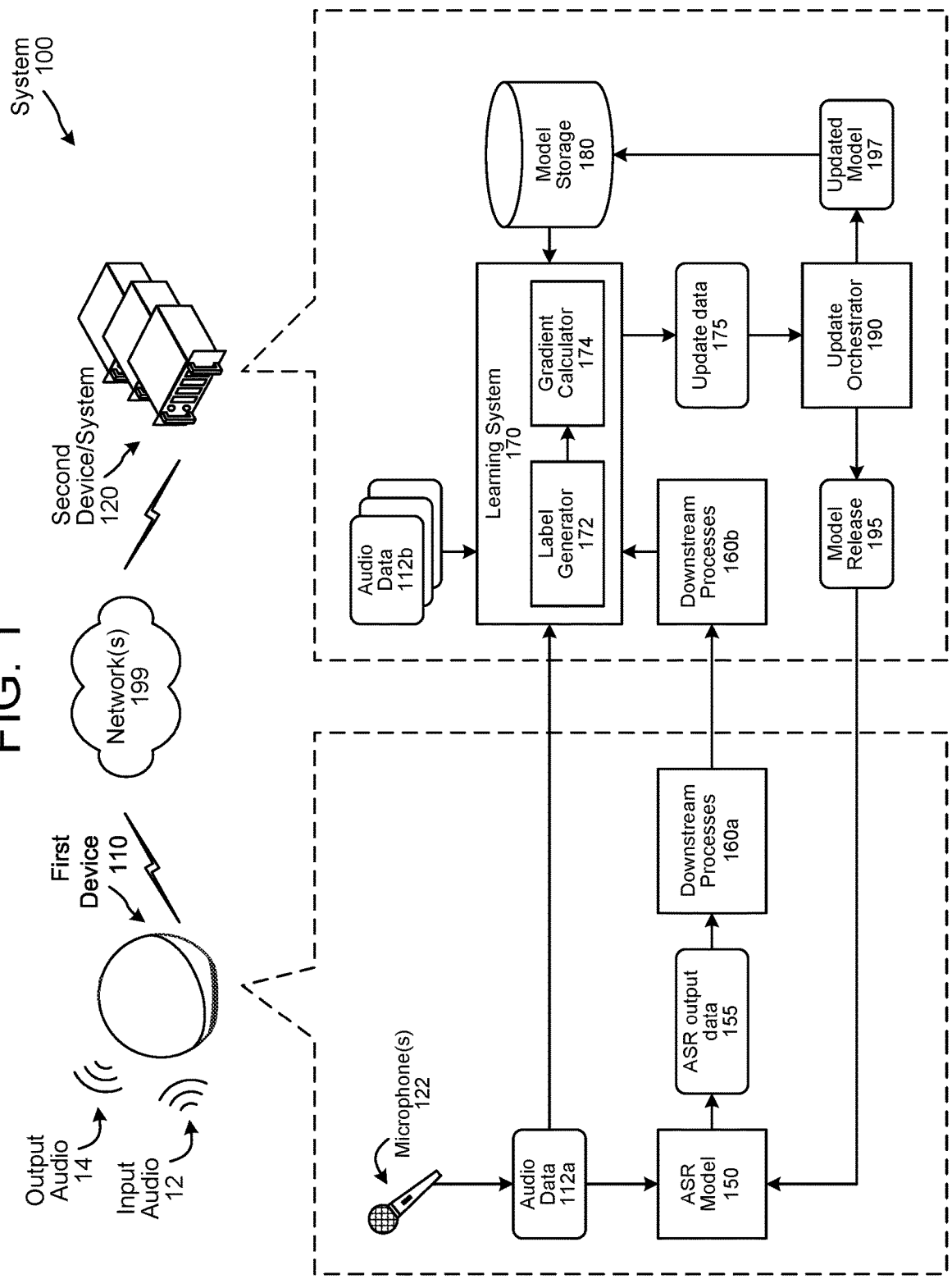
FIG. 1 is conceptual diagrams illustrating an example system for self-supervised learning for speech processing models, according to embodiments of the present disclosure.

A computer system may use one or more machine learning models to process input data to make inferences and/or predictions. Such machine learning models may include artificial neural networks (NN) such as convolutional networks (CNN), recurrent neural networks (RNN), long short-term memory (LSTM), transformers, conformers, etc. A NN may be made up of one or more layers, with a layer including one or more cells (also referred to as artificial neurons). A cell may include a number of inputs and outputs. A cell may receive inputs and generate one or more outputs by performing one or more mathematical and/or logical operations described by one or more parameters of the cell. For example, a cell may take a weighted sum of input values and apply an activation function on the result to yield the output(s). Some cells may additionally perform operations based on a previous output, a memory state, a context signal, etc. A computer system may train a NN by various techniques to improve results of the NN with respect to a dataset by adjusting some or all of the parameters.

From time to time, NN model parameters may be updated based on new training data or some other improvement. In some cases, a NN model may operate on a number of different decentralized devices. Each device may receive data that can be used to improve the NN model. Various techniques can be used to improve the performance of NN model instances operating on multiple devices based on the diversity of data received by the different devices. These techniques can require varying amounts of resources and, as result, may impose device resource constraints in some embodiments. For example, it may be desirable to reduce sharing of certain types of data, and solutions discussed herein can enable such functionality with relatively little the memory and/or compute resource requirements to perform the calculations.

Offered are a system, method, and other technology that can be used for updating a first NN model using labels generated by a second NN model. The techniques may combine aspects of federated learning and self-supervised learning to, for example, generate updates for NN model instances operating on different devices (e.g., decentralized user and/or edge devices) based on data received by the different devices. The system may include using a "teacher" model to process data received by a device to generate a labeled dataset. The system may use the labeled dataset and a "student" model to calculate gradient data for updating the student model. The student model may be at least substantially the same as (e.g., a duplicate of), or similar to an NN model component configured to operate on a device. The system may validate the updated student model to determine, for example, whether it exhibits improved performance when processing the newly received data and/or historical data. The system may distribute a validated update to the devices.

In an example implementation, a NN model instance may operate on a device and process data received by the device.

For example, the device may be a voice-controlled device and the received data may be audio data representing speech. The device may perform automatic speech recognition (ASR) processing on the audio data using an ASR model. The device may, subject to certain permissions and regulations, send the audio data to a second device or system for use in generating ASR model updates. The system may receive audio data from multiple devices, and generate a global update that allows devices to reap the benefit of learning based on speech received by other devices, without sharing some types of data with the devices.

The system may process the received data in an online, streaming manner in which data received from a device is processed in real-time or near real time to determine whether it is to be used for model training. For example, when data is received, the system may determine whether data from the particular device is to be used for training. If so, the system may generate labels for the data. The system may determine whether to use the labeled data for model training based on various factors such as a confidence value associated with the label(s), the labels themselves, and/or indications from downstream processing of the received data. Data not selected for training can be discarded. If the labeled data is selected for model training, the system may calculate gradient data using the student model. Following gradient calculation, the received data may be deleted. Gradient data may be aggregated for various utterances and/or devices, and the model may be iterated (in some implementations, subject to validation). Following an iteration, the gradient data may be deleted. From time to time (e.g., after a certain number of iterations, a predetermined period of time, after achieving a certain improvement in model performance), a model update may be sent to the devices. In this manner, the system can perform continuous learning without persisting the received data or gradients.

Although ASR processing is used to illustrate example operations, the techniques are not so limited, and may apply to updating machine learning models of various types, architectures, and applications. These and other features of the disclosure are provided as examples, and maybe used in combination with each other and/or with additional features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is conceptual diagrams illustrating an example system 100 for self-supervised learning for speech processing models, according to embodiments of the present disclosure. The system 100 may include at least a first device 110, such as one of the user devices 110 described with reference to FIGS. 10 and 12, and a second device/system 120 such as one of the systems 120 described with reference to FIG. 11. The first device 110 and second device/system 120 are not so limited, however; for example, either or both of the first device 110 and the second device/system 120 may be a user device, an edge device, a server system, etc. The first device 110 and second device/system 120 may communicate over one or more computer networks 199. The systems 120 may be in close proximity to the device 110 (e.g., in the same room, building, complex, etc.) or may be remote from the device 110 (e.g., in a datacenter and/or otherwise implemented "in the cloud"). In some implementations, the device 110 and/or second device/system 120 may additionally communicate with one or more additional systems 120 and/or skill support systems 525, which may provide additional capabilities to the system 100, as described with reference to FIG. 5. The device 110, system 120, and/or skill support systems 525 may include similar or different hardware and/or software. Various examples of devices/system features are described in additional detail below with reference to FIGS. 11 through 12.

The device 110 may be, for example, a voice-controlled device that may receive input audio 12 (e.g., human speech) and/or emit output audio 14 (e.g., synthesized speech). A user may interact with the device 110 using a spoken utterance (e.g., request and/or command), and the device 110 and/or system 120 may respond by performing one or more actions for and/or on behalf of the user. The device 110 may receive the input audio 12 via one or more microphones 122. The device 110 may process the resulting audio data 112a using various components and/or models, such as an ASR model 150. The ASR model 150 may generate ASR output data 155, which may include data representing a transcript of the utterance. One or more downstream processes 160a and/or 160b (collectively "downstream processes 160"), such as natural language understanding (NLU), entity resolution, skills, etc., may further process the ASR output data 155 (or data based thereon) to identify domain, intent, and/or entity information, and initiate a corresponding action (e.g., answering a question, placing an online shopping order, streamlining media). The downstream processes 160 may be performed by the device 110 and/or the system 120.

As language evolves and new words and/or phrases appear (or increase in usage frequency), the ASR model 150 may benefit from updated training based on recent data. The device 110 may, however, lack hardware resources and/or access to a diverse enough dataset to perform local learning and update processes. Accordingly, the device 110 may provide the audio data 112a to the system 120. The system 120 may receive additional audio data 112b, 112c, and 112d (collectively "audio data 112") from other devices 110 as well. The system 120 may use the audio data 112 to generate a model update for instances of the ASR model 150 operating on the various device 110.

The system 120 may include a learning system 170. The learning system 170 may include a label generator 172 and a gradient calculator 174. The label generator 172 may include a "teacher" model that can process the audio data 112 in a manner similar to the ASR model 150 to generate labels for the audio data 112. The teacher model may be a larger, more powerful model that can produce more accurate transcriptions (e.g., the labels) than the ASR model 150. Its resource requirements may be prohibitive for use on the device 110. For example, the ASR model 150 operating on the device 110 (e.g., a "student" model) may be a long short-term memory (LSTM) based recurrent neural network transducer (RNN-T) model, such as described below with reference to FIG. 6. An RNN-T is a type of neural network that can process a sequence of inputs in order, so that the output corresponding to each input factors in both the inputs and the outputs that precede it. RNNs work well for ASR because they can model temporal dependencies in audio sequences effectively. RNNs may, however, struggle to model long-range global context. An LSTMs is a type of NN architecture developed to improve modeling of distant features in sequential data. An LSTM is made up of a sequence of cells that can each remember values over arbitrary time intervals, which gives the LSTM a relative insensitivity to gap length relative to RNNs. The student model may vary in a number of encoder layers and/or feature frame rates. A first example student model may contain 60M parameters with a 5×1024 LSTM encoder, 2×LSTM prediction network, and a feed-forward join network with tanh activation. The input embeddings of the prediction network may be 512 dimensional. A 4,000 subword piece tokenizer may be used. A second example student model may contain 90M parameters with an 8×1024 LSTM encoder, a prediction network of size 2×LSTM, and a feed-forward join network with tanh activation. The input embeddings of the prediction network may be 512 dimensional. A 2,500 subword piece tokenizer from a uni-gram language model may be used. The encoder may use an LSTM-based time-reduced RNN multi-layer (for speed of training and inference) with feature frame rate set to 3 layers. Each of the feature frame layers may have 1536 units and the LSTM projection with a size of 512. In either case, SpecAugment may be applied to the audio features (e.g., LFBE coefficients), and may augment the features by one or more of warping, masking blocks of frequency channels, and/or masking blocks of time steps. The student models may be pre-trained on a combination of human-transcribed data (e.g., 120 k hours) and 340 k hours of semi-supervised learning (SSL) data generated using a decoded labels from a teacher model. The student models may be further trained using an additional amount of SSL data (e.g., 180 k hours including teacher generated labels). The various training data may represent different time periods; for example, data from the previous six months, one year ago, two years ago, etc.

In contrast, a teacher model employed by the label generator 172 may be a larger model trained on more and/or different data, and may be used to generate SSL data for training a student model. In some implementations, the label generator 172 may employ multiple teacher models; either one at a time or in combination. A first example teacher model may be an RNN-HMM hybrid ASR system trained on 100$k$ hours of data. Machine transcripts from this teach model may be used to bootstrap and/or provide transcript for an additional dataset (which may be larger and/or represent newer data); for example, 360 k hours. The combined data may be used to train one or more additional teacher models. A second example teacher model, and one which may be trained using data generated by the first teacher model, may be a conformer-based ASR architecture having 122M parameters, an encoder with 17×512 LSTM layers, 8 attention heads with 32 dimensional convolution kernel. The prediction network may use 2×1024 LSTM layers. A conformer combines the ability of convolutional neural networks (CNNs) to exploit local information with the ability of a self-attention mechanism to model long-range global context. A third example teacher model may be RNN-HMM hybrid ASR system trained using data generated by the first teacher model.

In some implementations, the label generator 172 may implement multiple teacher models (e.g., one or more RNN-HMMs and/or conformers) to generate different labeled training datasets. In some implementations, a student model may be updated using the different datasets, and the different results can be evaluated to gauge relative performance. The label generator 172 can thus output one or more labeled training datasets, which may represent the audio data joined with labels. In some implementations, feedback from the downstream processes 160 such as semantic labels (e.g., intents and/or entities) and customer friction (e.g., whether a user cancels an action and/or repeats a request) can be used by the learning system 170 to generate labels and/or to select particular audio data for inclusion/exclusion in the labeled training dataset. An example operation of using the label generator 172 in conjunction with an audio feature extraction pipeline to generate labeled data for training student models is described in additional detail below with reference to FIG. 3.

The gradient calculator 174 may process the labeled data using a "student" model. The gradient calculator 174 may retrieve, from a model storage 180, a student model matching and/or corresponding to the ASR model 150. The student model may represent the ASR model 150 by, for example, having the same or similar architecture and/or parameters, generating the same or similar gradients based on the same training data, and/or may being modified in the same or similar way based on the same update data. The gradient calculator 174 may calculate gradient data based on an error between labels of the labeled training dataset and labels predicted by the student model based on the audio data in the labeled training dataset. The gradient calculator 174 may output update data 175, which may consist of the gradient data calculated for the labeled training dataset, or aggregated gradient data calculated for multiple labeled training datasets. In some implementations, the gradient calculator 174 may calculate different gradient data using different training parameters; for example, different device selection criteria, different data selection criteria, different data aggregation techniques, different loss functions, different combinations of new versus historical training data, etc. The gradient calculator 174 may thus send the update data 175 to an update orchestrator 190.

An update orchestrator 190 may aggregate update data 175 calculated for one or more rounds of data collection and/or by one or more different learning schemes, and generate a model release 195. In some implementations, the update orchestrator 190 may validate the update data 175. For example, the update orchestrator 190 may test an updated model using one or a combination of the current labeled training dataset and a historical training dataset to determine whether the updated model performs better than a previous version of the model according to a performance metric (e.g., word error rate or other metric). If the updated model does not perform as well as the previous version, the update orchestrator 190 may discard the update. If the updated model performs better than the previous version, the update orchestrator 190 may generate an updated model 197, and send it to the model storage 180 for use in a subsequent learning iteration. If the update orchestrator 190 determines to update a deployed model or models, it may also send a model release 195 to the device 110 (and/or other devices 110) for updating the on-device ASR model 150. In some implementations, the update orchestrator 190 may receive and evaluate multiple sets of update data 175; for example, based on different gradient data determined using different training parameters. In a manner similar to the validation process, the update orchestrator 190 may evaluate multiple versions of the updated model against each other and/or a previous version of the model. The update orchestrator 190 may determine a highest performing model, and store the updated model 197 and/or package a model release 195 for deployment. The system 100 may repeat the learning process for subsequently received audio data 112; for example, by further iterating updated model 197 generation and/or model release 195 deployment. Additional details of operation of the system 100 are described with reference to FIG. 2 below.

Figure 2:
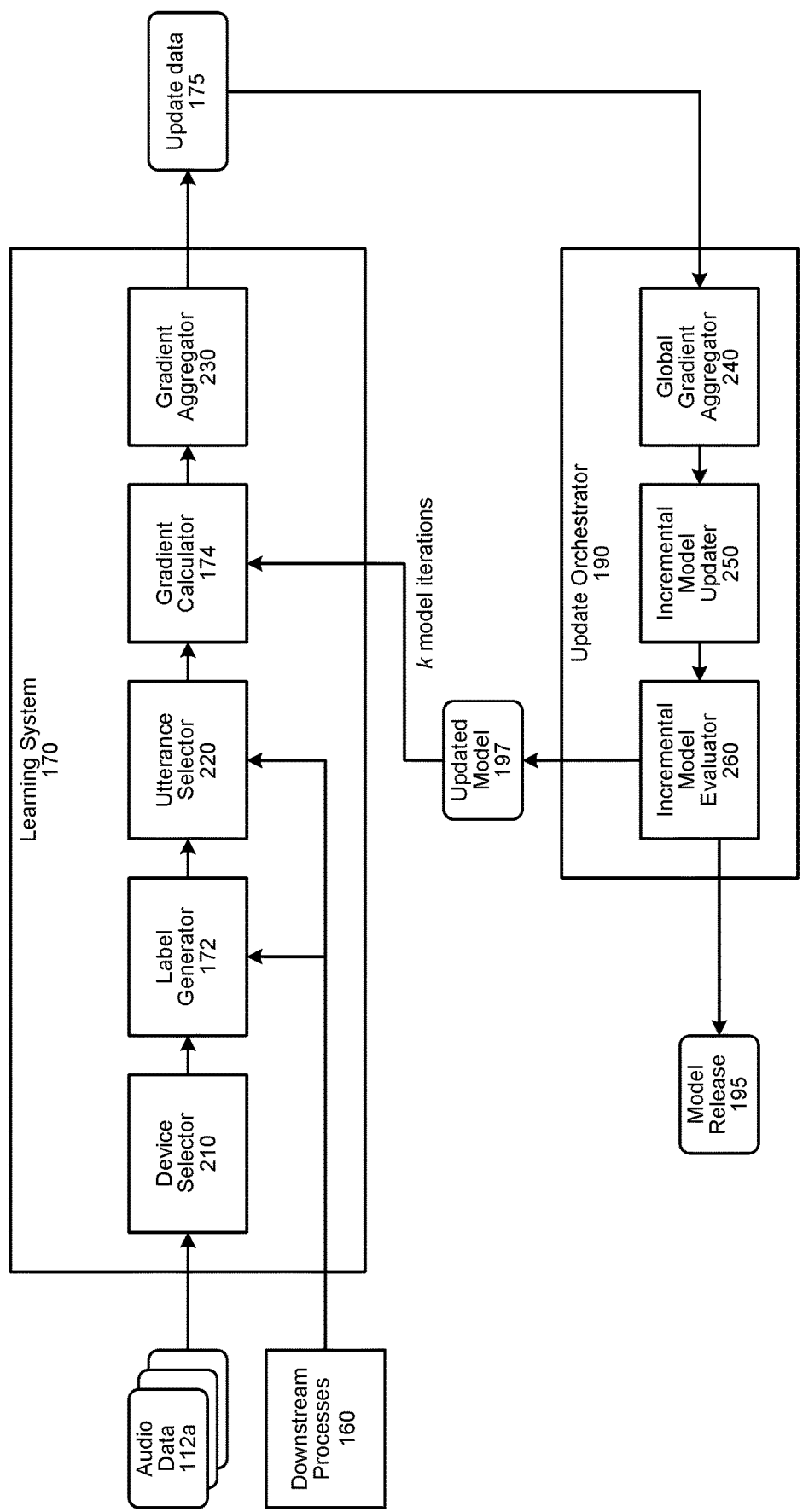
FIG. 2 is conceptual diagrams illustrating example operations of the system, according to embodiments of the present disclosure.

FIG. 2 is conceptual diagrams illustrating example operations of the system 100, according to embodiments of the present disclosure. The learning system 170 may receive a notification when the system 100 receives a new request (e.g., new audio data 112 for processing). The system 100 may store the audio data 112 for a short time (e.g., a few seconds to a few minutes) prior to deletion. In that time, the learning system 170 may, in response to receiving the notification, pull the audio data 112 from a cache or other temporary storage. The learning system 170 may process the data to generate a labeled training dataset, which it may then use to calculate gradient data for a machine learning model to be updated. The update orchestrator 190 may aggregate the gradient data (e.g., the update data 175), generate a new machine learning model, and evaluate it to ensure directional improvement in performance. Following an iteration, the gradient data may be discarded. The update process may repeat for k iterations of the model (e.g., 1, 10, 100, etc. update iterations). After a certain number of iterations and/or when a predetermined improvement in model performance has been achieved, the update orchestrator 190 may publish a model release 195, and send it to one or more devices 110 for updating a machine learning model thereon. The model release 195 may include data related to model parameters and/or updated values for some or all model parameters.

The learning system 170 and update orchestrator 190 may be configured to operate on received data (e.g., audio data 112) in a streaming fashion; for example, as a time-ordered sequence of data. That is, data may be selected and/or processed as it is received, and without long-term storage and batch retrieval.

In some implementations, the system 100 may include a device selector 210. The device selector 210 may select requests (e.g., audio data 112) for devices 110 in a training pool. The training pool may consist of a single device 110, a random subset of devices 110, a specific set of targeted device 110, or all device 110 in the system 100. The device selector 210 may select devices 110 for inclusion randomly or based on heuristics aimed at improving the model in a particular way. In some implementations, the device selector 210 may also perform first-pass request filtering to avoid expensive label generation (e.g., for audio data 112 that is too long and/or exhibits characteristics that make it difficult to process such as low volume and/or high noise). The label generator 172 may generate labels for selected audio data 112 to generate the labeled data as described in additional detail below with reference to FIG. 3. In some implementations, the label generator 172 may be updated by a weakly supervised process based on feedback received from downstream processes 160 and/or other signals. For example, the label generator 172 may receive semantic labels determined for the same audio data 112 processed using NLU and/or entity resolution. The label generator 172 teaching model(s) may be updated based on the semantic labels being consistent or inconsistent with labels generated by the label generator 172.

In some implementations, the system 100 may include an utterance selector 220. The utterance selector 220 may determine whether or not to include labeled data from the label generator 172 in the labeled training dataset. The purpose of the utterance selector 220 is to identify "interesting" utterances to learn from; for example, by prioritizing utterances with higher-quality labels and/or utterances likely to yield the most training benefit. The utterance selector 220 may select utterances characteristics of the labeled data and/or feedback signals from downstream processes.

In some implementations, the utterance selector 220 may select utterances for inclusion in the labeled training dataset based on a confidence score indicating a likelihood that the labeling is accurate. The utterance selector 220 may select utterances having a confidence score satisfying one or more conditions such as falling within a range of confidence scores. For example, the utterance selector 220 may not include an utterance corresponding to a very high confidence score (e.g., an utterance that is trivial to transcribe) or an utterance corresponding to a low confidence score (e.g., unreliable labels).

In some implementations, the utterance selector 220 may select data for inclusion based on feedback signals from downstream processes 160. In some implementations, the utterance selector 220 may select data for inclusion in response to a "rewrite" of the request based on semantic tags generated by from downstream processes 160 such as NLU and/or entity resolution processes. For example, a user may rewrite a command in response to failed execution of the command and/or a system output requesting clarification of the command. In some cases, the downstream processes 160 may "rewrite" requests when an identified intent and/or entity differing from the text of the transcript is determined with high confidence. Such rewrites may reveal inaccuracies in a transcript determined by the ASR model 150 and/or the label generator 172. If the received semantic tags correspond to a signal indicating successful execution of a request, the utterance selector 220 may determine that the semantic tags are correct, and that utterances where the labeled data is consistent with the semantic tags and/or the ASR output data 155 is inconsistent with the tags should be included in the labeled training dataset.

In another example of leveraging downstream signals, the system 100 may generate signals related to customer friction. The system 100 may generate a signal that a user has canceled an action prior to completion, rephrased/repeated a request, and/or made a new request. In some cases, a user may manually or verbally enter (e.g., select or correct) a label via a graphical user interface (GUI) and/or voice user interface (VUI). In yet another example, the system 100 may generate a signal indicating a determination that a request was or was not satisfactorily handled. For example, if a request is for streaming media, and the media is allowed to play uninterrupted for a certain duration of time (e.g., 30 seconds), the system 100 may determine that the request was successfully handled. If, however, the stream is ended quickly, the system 100 may determine that the request was not successfully handled. Thus, the utterance selector 220 may select for inclusion utterances that resulted in customer friction and/or unsuccessful execution.

Signals from the downstream processes 160 may be delayed by processing, execution, and user response time. Thus, in some implementations, the audio data 112 may be stored for a short time (e.g., several seconds to minutes) to allow time to receive the signals. Once the learning system 170 has received such signals, it may pull the associated audio data 112, label it, and perform utterance selection as described above.

The gradient calculator 174 may receive the labeled training dataset from the utterance selector 220 and calculate gradients for the selected utterances as described previously and below with reference to FIG. 3. The gradient calculator 174 may send the gradient data to a gradient aggregator 230.

The gradient aggregator 230 may aggregate gradients across all requests, a subset of requests and/or devices 110, or per-device 110 to support personalization. After receiving a certain amount of gradient data (e.g., corresponding to a predetermined number of utterances and/or a predetermined duration of time), the gradient aggregator 230 may aggregate the gradient data by various techniques such as federated averaging, federated stochastic gradient descent, etc. In some implementations, the gradient aggregator 230 may support other federated optimizer such as FedProx, federated matched averaging, federated normalized averaging, and/or adaptive federated optimizer. Such techniques may allow the system 100 to perform more than one batch update on a local model (e.g., a student model), and send weight data (e.g., NN model parameters) rather than gradients to various NN model instances. For example, if the NN model instances start from the same initialization, averaging the gradients may be equivalent to averaging the weights themselves. In addition, averaging tuned weights coming from a same initialized model may not necessarily hurt the resulting averaged model's performance. This may simplify design and allow the gradient aggregator 230 to continue averaging gradients as it receives them for each new utterances processing (e.g., statelessly). To allay concerns related to storing per-device aggregated gradients and potentially extracting user data from them, the system 100 may implement one or more security measures such as secure multi-party computation (SMPC). SMPC is a technique in which, prior to storage, gradient data is encrypted in a manner that allows aggregation but not individual (e.g., per-user and/or per-device) decryption. The gradient aggregator 230 may publish the aggregated gradient data as update data 175. The gradient aggregator 230 may send the update data 175 to the update orchestrator 190, notify the update orchestrator 190 that new update data 175 is ready, and/or store the update data 175 for later retrieval.

The update orchestrator 190 may receive the update data 175 and iterate the learning process k times before generating a final model release 195. The update orchestrator 190 may include a global gradient aggregator 240. The global gradient aggregator 240 may receive the update data 175 (including multiple batches of update data 175) from the learning system 170 or multiple learning systems 170 running in parallel and/or corresponding to multiple devices 110. The global gradient aggregator 240 may implement SMPC techniques to secure user information when handling the gradient data.

In some implementations, the system 100 may include an incremental model updater 250. The incremental model updater 250 may apply the globally aggregated gradient data to the current iteration of the student model (e.g., as retrieved from the model storage 180) to produce the next iteration of the model (e.g., the updated model 197). In some implementations, the incremental model updater 250 may cause deletion of the gradient data once the model has been iterated, further securing user information.

In some implementations, the system 100 may include an incremental model evaluator 260. The incremental model evaluator 260 may be used to ensure that model iterations are directionally improving. For example, the incremental model evaluator 260 may process a historical dataset (e.g., human and/or machine annotated data from a previous and/or initial model training round) using the new model. The incremental model evaluator 260 may determine a performance metric for the new model; for example, a word error rate (WER) or other metric exhibited by an output of the processing. If the performance metric does not improve over the previous model version, the new model may be discarded. If the performance metric is better than that of the previous model version, the incremental model evaluator 260 may store the updated model 197 as an iteration. In some implementations, the incremental model evaluator 260 may evaluate multiple new models (e.g., generated using different training parameters) relative to each other. The incremental model evaluator 260 may select the new model exhibiting the best performance metric to store as the update model 197, subject to validating it against previous model versions.

In some implementations, the gradient calculator 174 may include features for facilitating rapid model iteration. For example, the gradient calculator 174 may have hot-loading capabilities for quickly loading a new updated model 197 and discarding the previous version. The hot-loading features may include a sync agent configured to check availability of new model updates 197. If a new model update 197 is ready to consume, the sync agent may download the model update 197 (e.g., onto a local disk), check that the model contained is different from the model currently loaded into memory, load the new model into memory, and unload the old model and delete it from storage. In some implementations, such hot-loading features may be available for teacher models as well (e.g., when retrained using downstream feedback signals or new human transcribed and/or SSL data).

After each iteration, the system 100 may discard the gradient data (e.g., the update data 175), thereby securing personal information against a gradient inversion attack. In this manner, the system can perform continuous learning without persisting the received data or gradient data. From time to time (e.g., after a certain number of iterations, a predetermined period of time, after achieving a certain improvement in model performance), the update orchestrator 190 may publish a model release 195, and send it to the device(s) 110.

Figure 3:
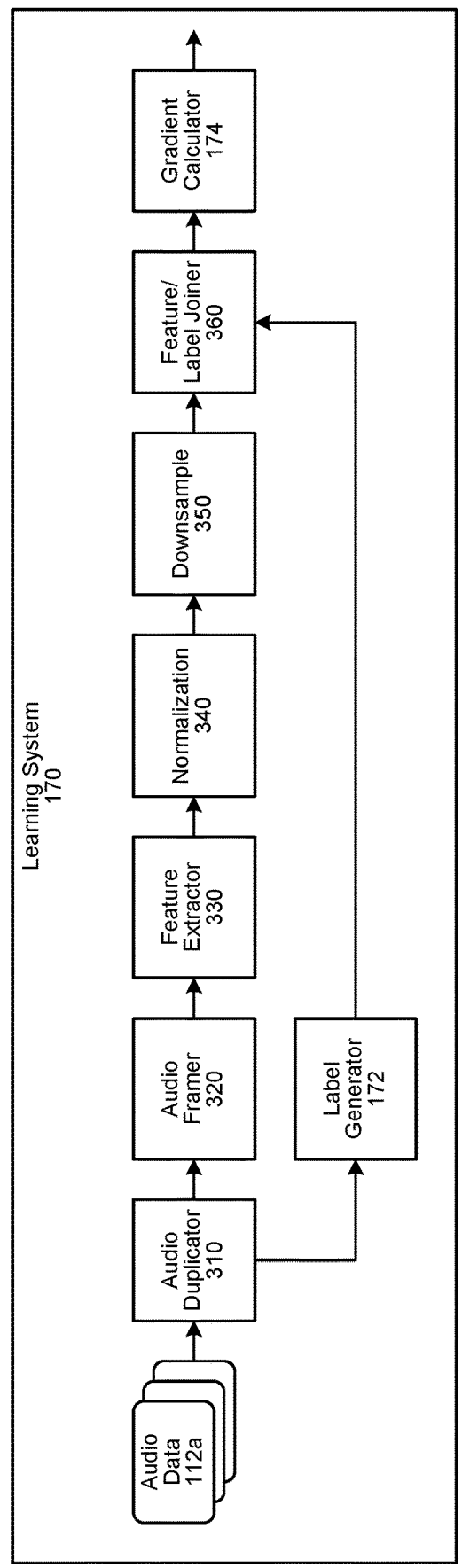
FIG. 3 is conceptual diagrams illustrating components of the learning system, according to embodiments of the present disclosure.

FIG. 3 is conceptual diagrams illustrating components of the learning system 170, according to embodiments of the present disclosure. The learning system 170 may receive audio data 112 from one or more devices 110. In some implementations, the learning system 170 may include an audio duplicator 310. The audio duplicator 310 may duplicate a stream of audio such that each stream may be processed simultaneously by two paths in a scatter-gather pattern (e.g., sending audio data 112 to two distinct processing paths and rejoining the resulting data later using a feature/label joiner 360). The rejoined data may be processed by the gradient calculator 174 to generate gradient data for iterating a particular model.

The first path may include a feature extraction pipeline for processing of the audio data 112 to generate a normalized spectrogram pattern. This processing may be similar to preprocessing performed by/for other audio processing models such as those used for ASR and/or acoustic event detection. This processing may be similar or analogous to processing performed by an acoustic front end (AFE), such as the AFE 524 described below.

The learning system 170 may include an audio framer 320. The audio framer 320 may convert raw audio to audio samples. The audio framer 320 may group the samples into audio frames as an output (e.g., where a frame may have a ~25 ms window size and 10 ms step size). Each audio frame may thus comprise data that contains samples for the channel(s) of the audio data. In one example, 25 ms worth of audio data may be sampled by the audio framer 320 at a configured sample rate to determine data for that particular audio frame. The audio framer 320 may then look at a different 25 ms worth of audio data (offset from the first group of audio data by 10 ms) to determine audio data for the next audio frame. Thus, one frame may represent audio for a 0-25 ms window while the next frame may represent audio for a 10-35 ms window. The feature extractor 330 may perform spectral analysis/extract acoustic features from each frame of audio data. The audio data may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. Thus the feature data determined by the feature extractor 330 may be grouped into feature vectors where one frame feature vector may represent features for a particular audio frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. For example, the feature extractor 330 may process each frame to generate log-filterbank energy (LFBE) features. The normalization component 340 may normalize raw LFBE features based on, for example, a mean and standard deviation learned from a training dataset. The distribution of the LFBE features may thus be normalized to, for example, a Gaussian distribution.

In some implementations, the learning system 170 may include a downsampling component 350. The downsampling component 350 may downsample frames of normalized feature data to reduce a number of computations to be performed by the gradient calculator 174; e.g., by combining the data from two, three, four, or more frames into a single frame. The downsampling component 350 can combine frames by, for example, averaging or summing values across the frames to be combined, and/or performing other mathematical operations.

The label generator 172 may Label Generator may be responsible for generating labels (e.g., a transcript in the form of words and/or tokens) for each utterance received by the learning system 170. The label generator 172 may run the teacher model (e.g., an ASR acoustic model) to generate ground-truth labels for use in calculating gradients for the student model. Using a teacher model (or multiple teacher models) can allow for a more accurate but slower transcription (e.g., slower than real-time and thus not less suitable for processing user requests). For example, the teacher model may be a conformer or bi-directional long short-term memory (LSTM). In some implementations, teacher LSTM and RNN-T models may be used with their results combined to produce more accurate labels. Hypotheses generated by such semi-supervised learning (SSL) techniques may be treated as ground-truth labels if confidence in the result is relatively high (e.g., above a threshold). Labels having a relatively low confidence may be excluded by, for example, feature/label joiner 360 and/or the utterance selector 220.

The learning system 170 may include a feature/label joiner 360. The joiner 360 may receive the normalized LFBE data from the normalization component 340 and join them with the labels generated by the label generator 172. The joiner 360 may analyze output from the label generator 172 and filter out data (e.g., utterances) that does not satisfy certain conditions, such as label confidence. The joiner 360 may help ensure that gradients are calculated on frames/labels of sufficient quality and/or prioritize data predicted to lead to good training results. The joiner 360 may also gather the results from the fan-out of the other steps to provide the gradient calculator 174 with a single, aligned input. The output of the joiner 360 may be in the form of paired (e.g., X, Y) instances that can be used as ground truth labels to train the student model.

The gradient calculator 174 may receive the labeled training dataset from the joiner 360. The labeled training dataset may include the audio frames (e.g., downsampled, normalized LFBE features) and labels. The gradient calculator 174 may calculate gradients from the audio frames and labels by, for example, performing a forward pass and then back-propagation on the model to be improved (e.g., the student model such as an ASR RNN-T model). The gradient calculator 174 may process individual requests or batches of k requests. For batch processing, the learning system 170 may include a buffer between the joiner 360 and the gradient calculator 174. When the buffer is full (or based on some other trigger such as elapsed time), the batch may be pushed to the gradient calculator 174. The gradient calculator 174 may send the calculated gradients to the gradient aggregator 240 as previously described.

Figure 4:
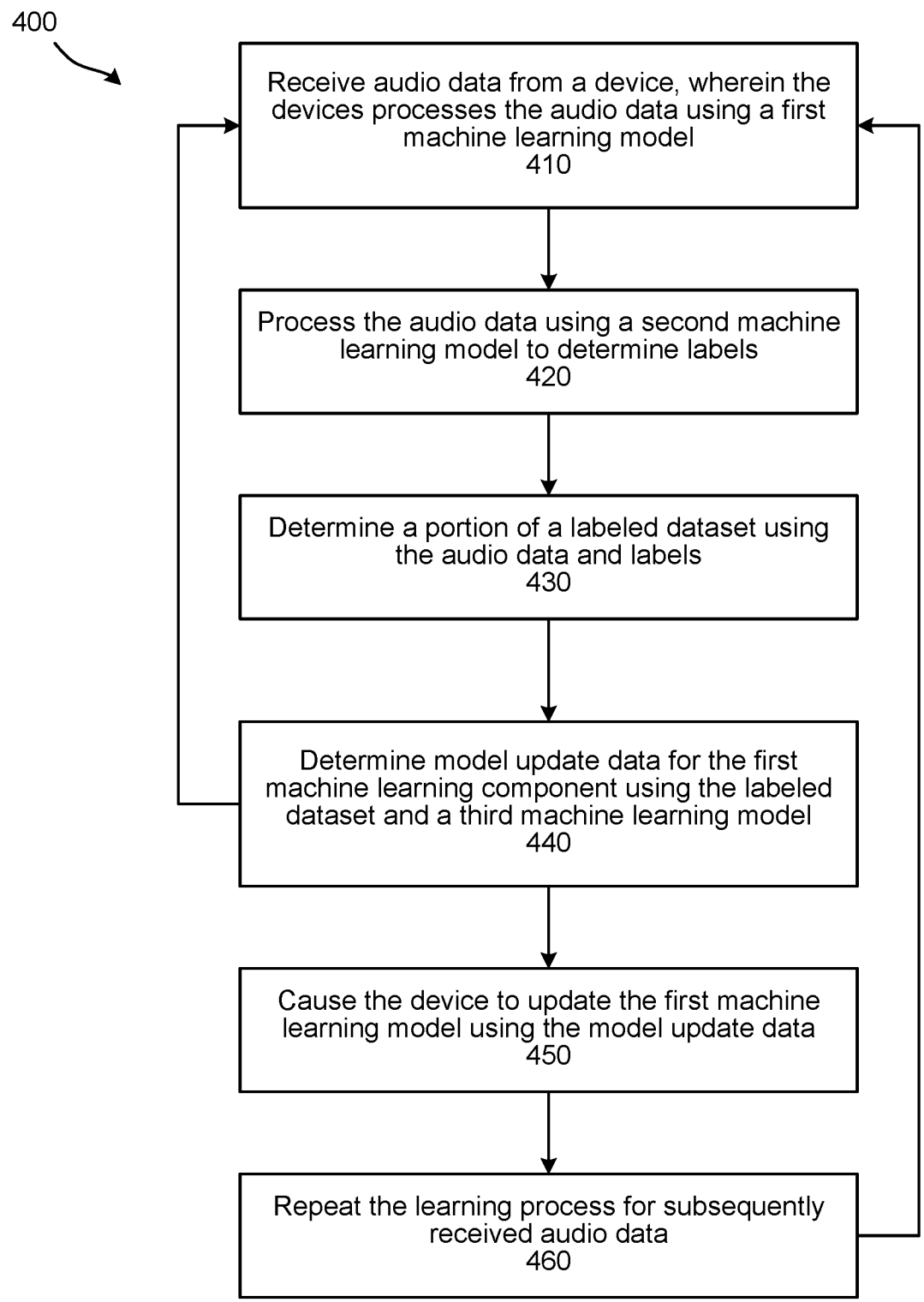
FIG. 4 is a flowchart illustrating an example method of self-supervised learning for speech processing models, according to embodiments of the present disclosure.

FIG. 4 is a flowchart illustrating an example method 400 of self-supervised learning for speech processing models, according to embodiments of the present disclosure. The method 400 may be performed using, for example, components of the system 100. The method 400 may include receiving (410) audio data from a device 110, wherein the device processes the audio data using a first machine learning model. The device 110 may be, for example, a voice-controlled device 110 as described in FIGS. 10 and 12. The machine learning model may be (or operate) a machine learning model such as a neural network. In some implementations, the model may be the ASR model 150; however, other types of models may be used. The device 110 may process the audio data to determine ASR output data 155, which may be processed in one or more downstream processes 160 including NLU, entity resolution, skills, etc.

The method 400 may include processing (420) the audio data using a second machine learning model to determine labels. The second machine learning model may be, for example, the label generator 172. The second machine learning model may operate a machine learning model that process a same type of data as the first machine learning model to produce a same type of output; for example, processing audio data representing speech to determine a transcript. The second machine learning model may, however, be a larger and/or more powerful or accurate model than the on-device first machine learning model. The labels determined by the second machine learning model may be used as part of a self-supervised learning process to train and update the first machine learning model.

The method 400 may include determining (430) a portion of a labeled dataset using the audio data and labels. The learning system 170 may join the audio data and the labels to create a portion of a labeled dataset. In some implementations, audio data and labels corresponding to an utterance may be selected for the labeled dataset or discarded based on various characteristics and signals. For example, an utterance may be included in a dataset based on one or more of an appearance of a rare word, having a label confidence that falls within a certain range (e.g., indicating sufficient confidence in the label while possibly excluding utterances that are trivial to transcribe), and/or downstream signals (e.g., indicating customer friction or a system rewrite of text based on an intent classification and/or entity resolution). The labeled dataset may then be compiled using utterances representing one, a subset, or all devices 110 in the system 100 and/or based on the utterance selection criteria.

The method 400 may include determining (440) model update data for the first machine learning model using the labeled dataset and a third machine learning model; for example, that represents the first machine learning model operating on the first device 110. Once the labeled dataset has been compiled, the learning system 170 may retrieve a model that matches the first machine learning model. The gradient calculator 174 may calculate gradient data from the audio frames and labels by, for example, performing a forward pass and then back-propagation on the model. The gradient data may be compiled from multiple utterances, devices, and/or training rounds to generate the model update data. In some cases, the model update data may be validated prior to pushing to the device 110. The incremental model evaluator may evaluate the updated model using, for example, a historical dataset, to ensure that model iterations improve directionally (e.g., exhibit an improved performance metric such as WER on a human transcribed and/or SSL dataset). In some cases, the learning system 170 may generate multiple candidate model updates, which the incremental model evaluator 260 may evaluate to select a best performing model update.

In some implementations, the system 100 may make incremental updates to the model prior to publishing an update. Thus, in some cases, the method 400 may return to a stage 410 and collect additional audio data, process it to generate labels, calculate new gradients, and evaluate a subsequent model update. The method 400 may repeat this cycle a number of times until a predetermined number of iterations have occurred, a predetermined amount of time has elapsed, and/or a predetermined increase in a performance has been achieved, at which point the method 400 may proceed to a stage 450 to publish a model release to update the first machine learning model.

The method 400 may include causing (450) the device to update the first machine learning model using the model update data. Once a model update has been validated, the update orchestrator 190 can send a model release 195 to the device(s) 110. For example, the model release data 195 may include updated model parameters (e.g., NN model weights) for the first machine learning model, or information for modifying the parameters. The device(s) 110 may, upon receiving the model release data 195, update local models using updated parameters, weights, gradients, and/or other data contained in the model release 195. The update orchestrator 190 may also store the updated model 197 in the model storage 180 to be used for calculating gradient data for subsequently received and labeled audio data.

The method 400 may include repeating (460) the learning process using subsequently received audio data. Once a model update has been completed, the system may continue to collect and process audio data to further refine the machine learning models. The method 400 may thus return to the stage 410 and repeat the process.

Figure 5:
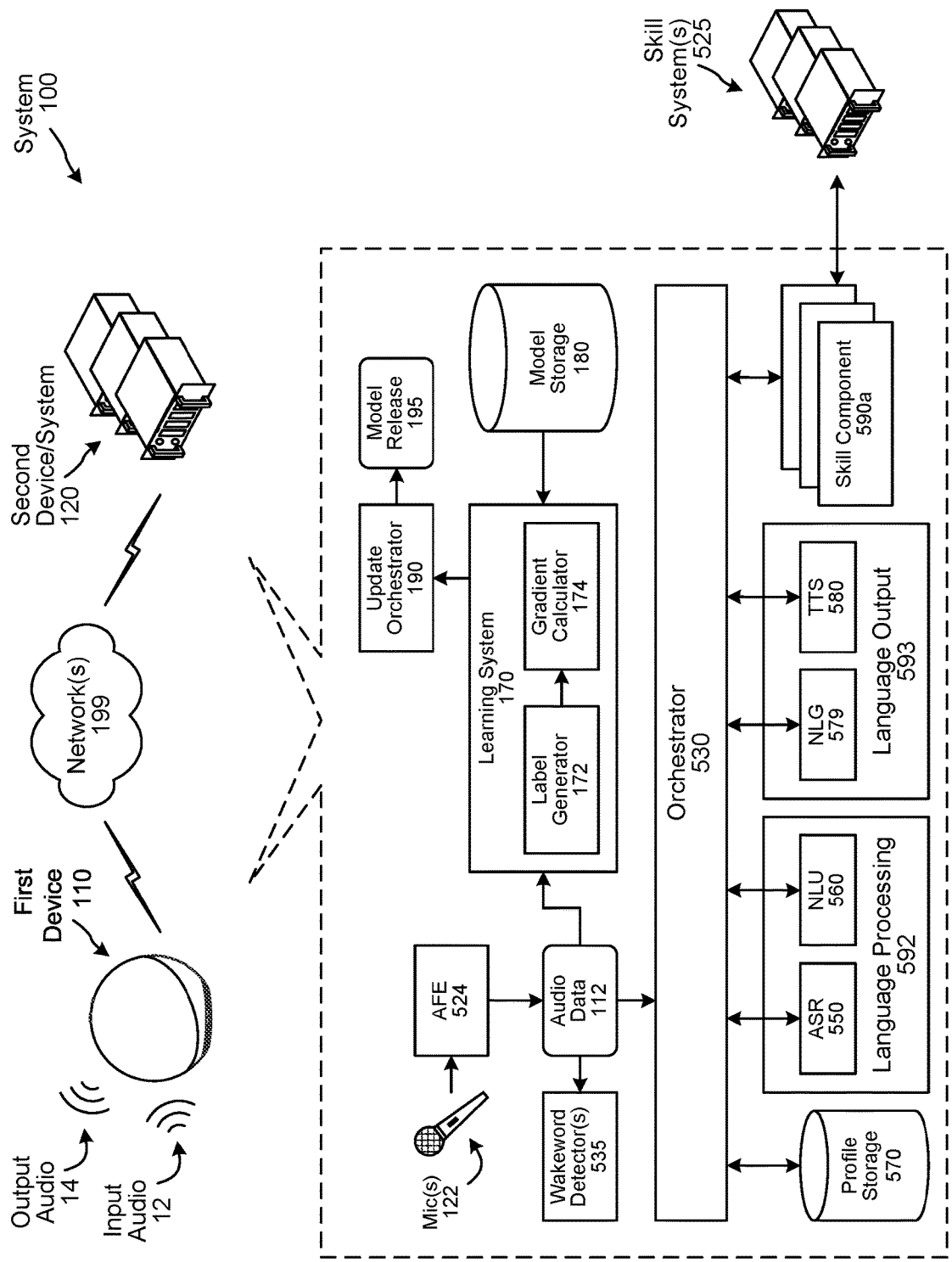
FIG. 5 is a conceptual diagram of components of the system, according to embodiments of the present disclosure.

FIG. 5 is a conceptual diagram illustrating a high level overview of example components of the system 100 including features for self-supervised learning for speech processing models, according to embodiments of the present disclosure. In addition to the components previously described in the context of self-supervised learning, the system 100 may include components for performing speech processing and synthesis, as well as for responding to natural language commands. The system 100 may include a wakeword detector 535, an orchestrator component 530, a profile storage 570, language processing components 592 including an ASR component 550 (e.g., which may include an ASR model 150) and an NLU component 560, language output components 593 including an NLG component 579 and a text-to-speech (TTS) system 580, and/or one or more skill components 590a, 590b, 590c, etc. (collectively "skill components 590"), which may be in communication with one or more skill support systems 525. The system 100 may provide output to a user in the form of synthesized speech, notification sounds, or other output audio 14.

The learning system 170 may be used to update various models used by the system 100; for example, machine learning models used by a wakeword detector 535, ASR component 550, NLU component 560, TTS component 580, skill component 590, etc. The learning system 170 may update models based on data received directly by the same device 110—for example, via the microphone 122—or based on data transmitted from the device 110 to the second device/system 120. Thus, the learning system 170 may be used to update a model operating a same device 110 or on a different, possibly remote, device. The components may reside in the device 110 and/or second device/system 120 such that various functionality described herein may be performed by the device 110, the second device/system 120, or may be divided or shared between the two. For example, in some cases, the device 110 may process audio data locally, whereas in other cases the device 110 may send audio data to the system 120 for processing. In some implementations, the first device 110 may perform initial processing of audio and/or other input data, and send a form of intermittent data to the second device/system 120. The intermittent data may include ASR data (such that audio data including a user's voice need not be sent from the user's device 110), update data pertaining to various models used by the first device 110, and/or commands to skill components 590, etc.

The system 100 may include one or more microphones 122 for receiving input audio 12. The system 100 may include an acoustic front end (AFE 524), which may convert the audio data from, for example, an analog signal into a digitized signal, as described further below. In some implementations, the system 100 may include multiple AFEs 524. For example, the AFE 524 providing audio data 112 to the wakeword detector 535 may differ from the AFE 524 providing audio data to ASR and/or AED components. This may be due to the ASR and/or AED components having a different context window from the wakeword detector 535. For example, the wakeword acoustic-feature data may correspond to three seconds of audio data, while the AED acoustic-feature data may correspond to ten seconds of audio data.

The system 100 may process the audio data 112 to determine whether speech is represented therein. The system 100 may use various techniques to determine whether the input audio data 112 includes speech. In some examples, a voice-activity detector may apply voice-activity detection (VAD) techniques. Such VAD techniques may determine whether speech is present in audio data 112 based on various quantitative aspects of the input audio data 112, such as the spectral slope between one or more frames of the audio data; the energy levels of the audio data in one or more spectral bands; the signal-to-noise ratios of the audio data in one or more spectral bands; or other quantitative or qualitative aspects. In other examples, the system 100 may include a classifier configured to distinguish speech from background noise. The classifier may be implemented by techniques such as linear classifiers, support vector machines, and decision trees. In still other examples, the system 100 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 535 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 535 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the wakeword detector(s) 535 may use one of a plurality of wakeword-detection models. Each model may be trained to detect a different wakeword. In some embodiments, a single model may detect multiple wakewords. Each wakeword may be associated with a different speech-processing system and/or different speech-processing system configurations (e.g., representing different virtual assistants available to the user via the system 100). Upon detection of a particular wakeword, the system 100 may process the audio data 112 by the corresponding speech-processing system configuration.

In various embodiments, the wakeword-detection model of the wakeword detector(s) 535 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 535 may determine a similarity score for the candidate wakeword based on how similar it is to the stored wakeword; if the similarly score is higher than the wakeword-detection threshold, the wakeword detector 535 may determine that the wakeword is present in the audio data, and if the similarity score is less than the wakeword-detection threshold, the wakeword detector 535 may determine that the wakeword not is present in the audio data. For example, if the candidate wakeword matches the stored wakeword very closely, the wakeword detector 535 may determine a similarity score of 100; if the candidate wakeword does not match the stored wakeword at all, the wakeword detector 535 may determine a similarity score of 0. If the wakeword detector 535 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Once a wakeword is detected by the wakeword detector(s) 535, the system 100 may begin processing speech represented in the audio data 112. The system 100 may send the audio data 112 to an orchestrator component 530. The orchestrator component 530 may include memory and logic that enables it to transmit various pieces and forms of data to various components of the system, as well as perform other operations as described herein. The orchestrator component 530 may be or include a speech-processing system manager, which may be used to determine which, if any, of the language processing components 592, language output components 593, and/or skill components 590 should receive and/or process the audio data 112 and/or data derived therefrom (e.g., by ASR, NLU, and/or entity resolution).

In some embodiments, the orchestrator component 530 and/or speech-processing system manager communicate with the language processing components 592 using an application programming interface (API). The API may be used to send and/or receive data, commands, or other information to and/or from the language processing components 592. For example, the orchestrator component 530 may send, via the API, the input audio data 112 to language processing components 592 elected by the speech-processing system manager and may receive, from the selected language processing components 592, a command and/or data responsive to the audio data 112.

The language processing components 592 may include an ASR component 550, which may transcribe the input audio data 112 into text data. The text data output by the ASR component 550 may represent one or more than one (e.g., in the form of an N-best list) ASR hypotheses representing speech represented in the input audio data 112. The ASR component 550 may interpret the speech in the input audio data 112 based on a similarity between the audio data 112 and pre-established language models. For example, the ASR component 550 may compare the input audio data 112 with models for sounds (e.g., acoustic units such as phonemes, senons, phones, etc.) and sequences of sounds to identify words that match the sequence of sounds of the speech represented in the input audio data 112. The ASR component 550 may the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein. The ASR component 550 is described in additional detail below with reference to FIG. 6.

Figure 7:
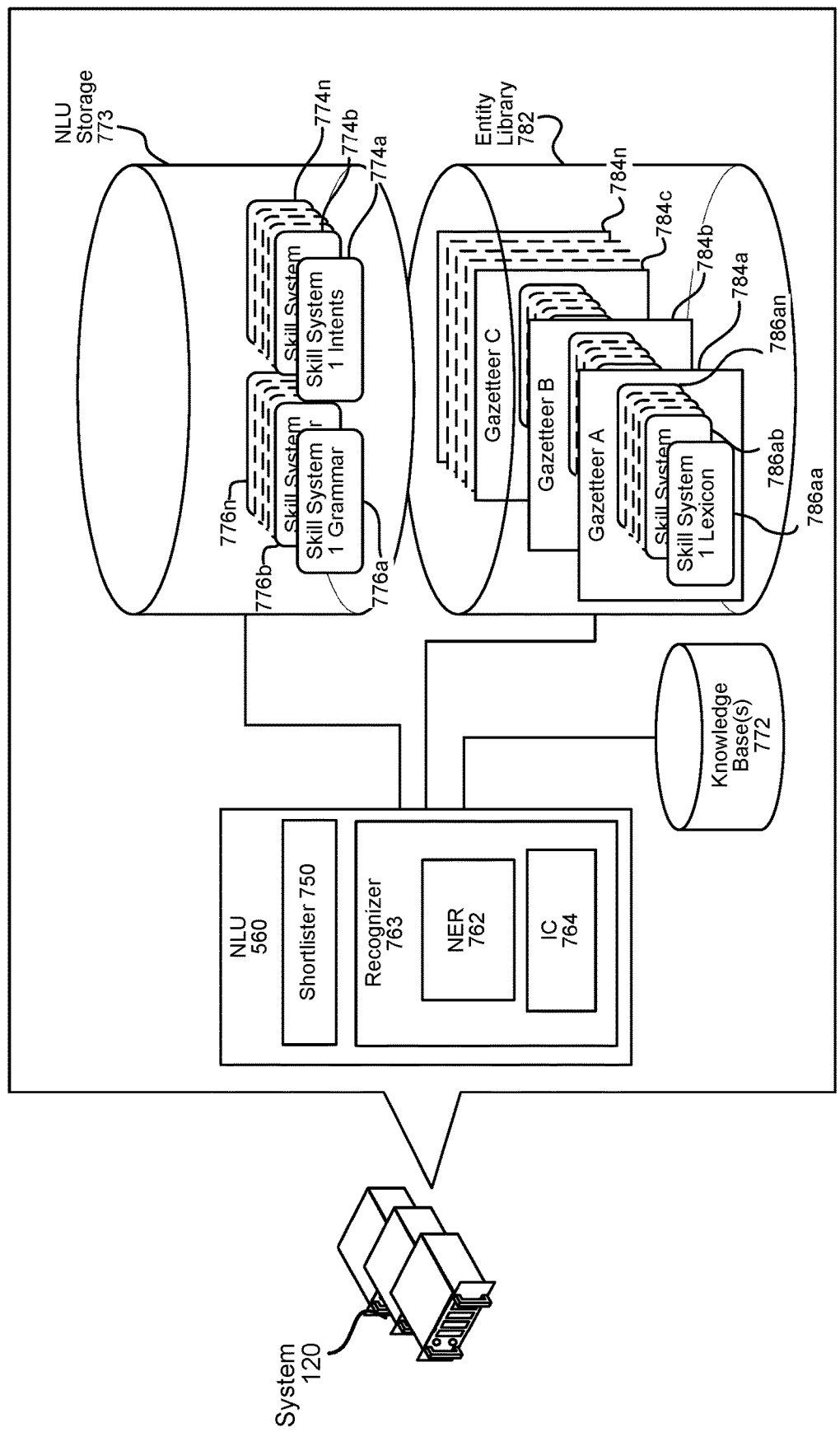
FIG. 7 is a conceptual diagram of how natural language processing is performed, according to embodiments of the present disclosure.
Figure 8:
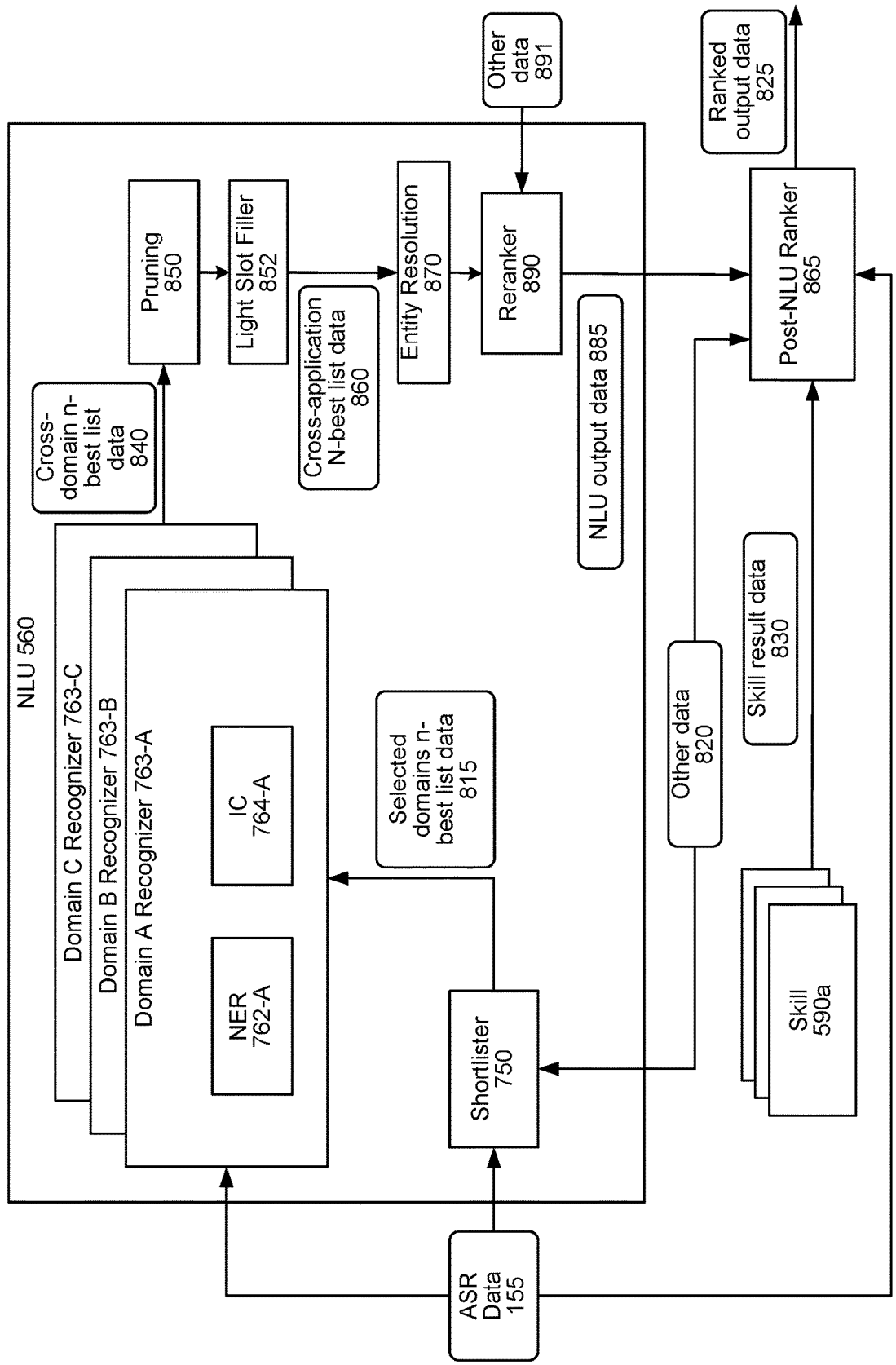
FIG. 8 is a conceptual diagram of how natural language processing is performed, according to embodiments of the present disclosure.

The language processing components 592 may further include a NLU component 560, which is shown in greater detail in FIGS. 7 and 8, that attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the user device 110, the system(s) 120, a skill component 590, a skill system(s) 525, etc.) to execute the intent. For example, if the text data corresponds to "play Africa by Toto," the NLU component 560 may determine an intent that the system output music and may identify "Toto" as an artist and "Africa" as the song. For further example, if the text data corresponds to "what is the weather," the NLU component 560 may determine an intent that the system output weather information associated with a geographic location of the user device 110. In another example, if the text data corresponds to "turn off the lights," the NLU component 560 may determine an intent that the system turn off lights associated with the user device 110 or its user.

The NLU results data may be sent (via, for example, the orchestrator component 530) from the NLU component 560 (which may include tagged text data, indicators of intent, etc.) to a skill component(s) 590. If the NLU results data includes a single NLU hypothesis, the NLU component 560 may send the NLU results data to the skill component(s) 590 associated with the NLU hypothesis. If the NLU results data includes an N-best list of NLU hypotheses, the NLU component 560 may send the top scoring NLU hypothesis to a skill component(s) 590 associated with the top scoring NLU hypothesis. In some implementations, the NLU component 560 and/or skill component 590 may determine, using the interaction score, text data representing an indication of a handoff from one set of language processing components 592 to another (e.g., corresponding to a different virtual assistant profile).

A skill component 590 may be software running on or in conjunction with the system 100 that is, or is similar to, a software application. A skill component 590 may enable the system 100 to execute specific functionality in order to provide data or produce some other requested output. The system 100 may be configured with more than one skill component 590. For example, a weather service skill component may enable the system 100 to provide weather information, a car service skill component may enable the system 100 to book a trip with respect to a taxi or ride sharing service, a restaurant skill component may enable the system 100 to order a pizza with respect to the restaurant's online ordering system, etc. A skill component 590 may operate in conjunction between the system(s) 120 and other devices, such as the user device 110, in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

Skill support system(s) 525 may communicate with a skill component(s) 590 within the system(s) 120 directly and/or via the orchestrator component 530. A skill support system(s) 525 may be configured to perform one or more actions. A skill may enable a skill support system(s) 525 to execute specific functionality in order to provide data or perform some other action requested by a user. For example, a weather service skill may enable a skill support system(s) 525 to provide weather information to the system(s) 120, a car service skill may enable a skill support system(s) 525 to book a trip with respect to a taxi or ride sharing service, an order pizza skill may enable a skill support system(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, an acoustic event detection (AED) skill that can detect noises such as shattering glass or a crying baby, as well as custom skills that are not associated with any pre-configured type of skill. The system 100 may include a skill component 590 dedicated to interacting with the skill support system(s) 525. A skill, skill device, or skill component may include a skill component 590 operated by the system 100 and/or skill operated by the skill support system(s) 525.

Figure 9:
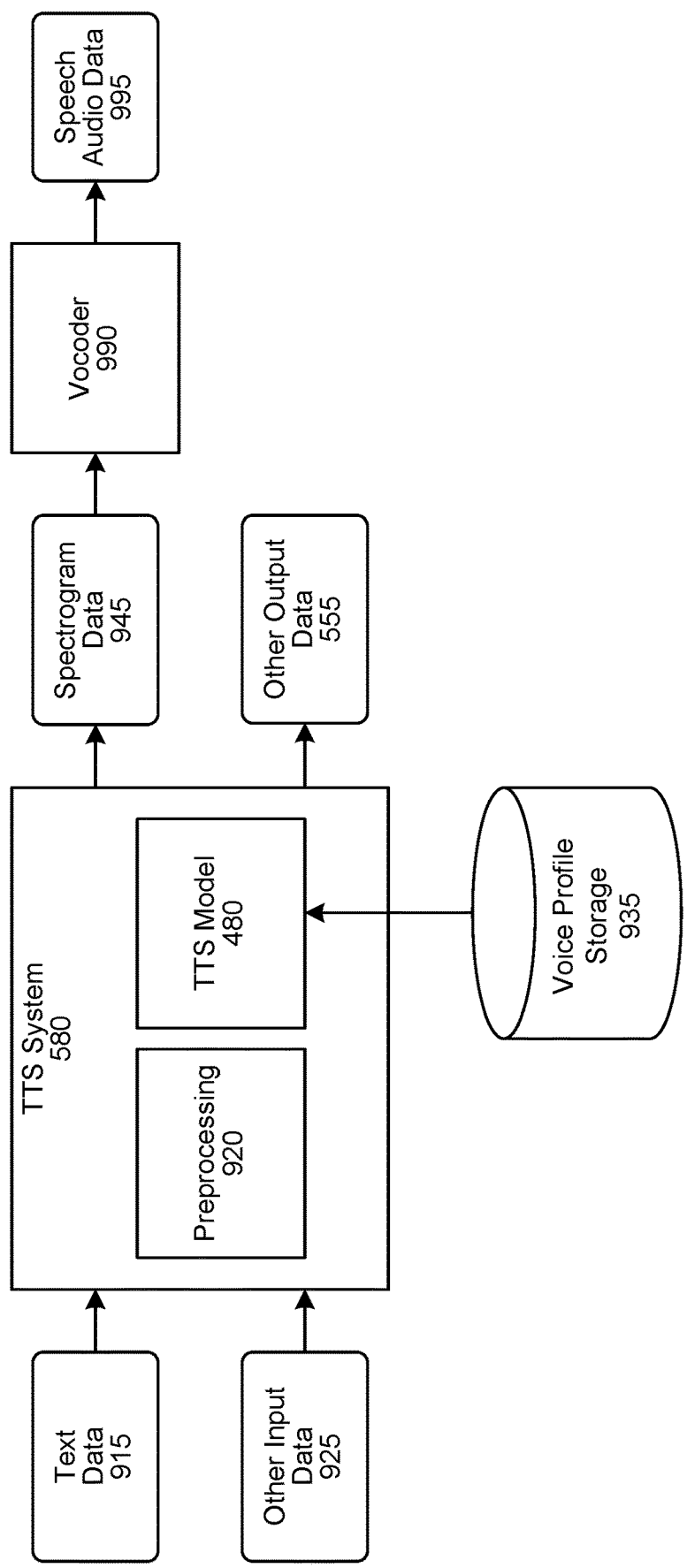
FIG. 9 is a conceptual diagram that illustrates operations for generating synthesized speech using a text-to-speech system, according to embodiments of the present disclosure.

The system 100 may include language output components 593 including a natural language generation component 579 and/or a TTS system 580, which is shown in greater detail in FIG. 9. The TTS system 580 may generate audio data (e.g., synthesized speech) from text data using one or more different methods. Text data input to the TTS system 580 may come from a skill component 590, the orchestrator component 530, and/or another component of the system. The text data may include an indication of a speech-processing component and/or data responsive to a command.

The system 100 may include profile storage 570. The profile storage 570 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage 570 may include one or more user profiles, with each user profile being associated with a different user identifier. Each user profile may include various user identifying information. Each user profile may also include preferences of the user and/or one or more device identifiers, representing one or more devices of the user. When a user logs into to, for example, an application installed on the device 110, the user profile (associated with the presented login information) may be updated to include information about the device 110. As described, the profile storage 570 may further include data that shows an interaction history of a user, including commands and times of receipt of commands. The profile storage 570 may further include data that shows when a second user was present to hear an indication of a handoff for a command uttered by a first user.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 100 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 6:
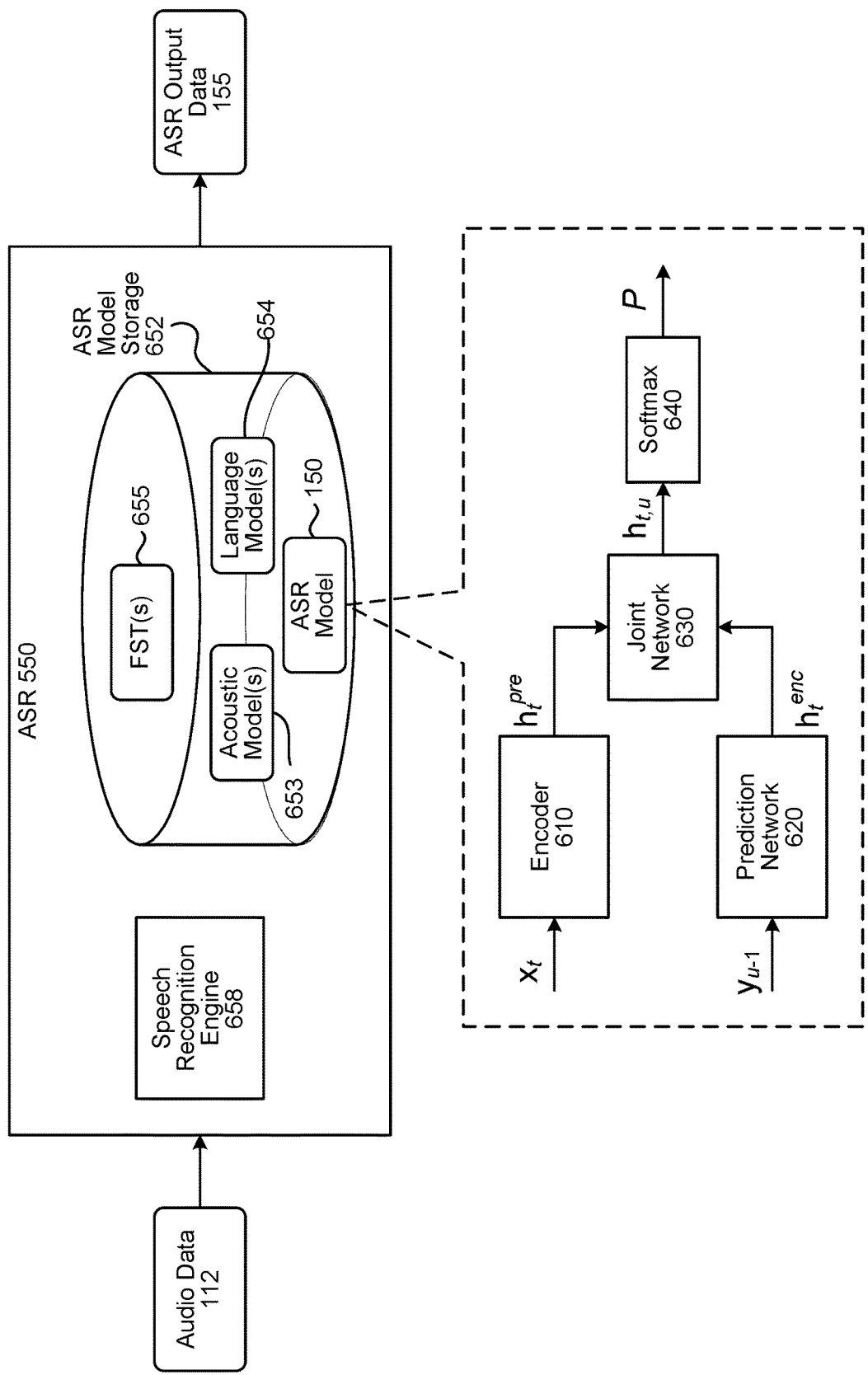
FIG. 6 is a conceptual diagram of an automatic speech recognition component, according to embodiments of the present disclosure.

FIG. 6 is a conceptual diagram of an ASR component 550, according to embodiments of the present disclosure. The ASR component 550 may receive audio data 112 and process it to recognize and transcribe speech contained therein. The ASR component 550 may output the transcript as ASR output data 155. In some cases, the ASR component 550 may generate more than one ASR hypothesis (e.g., representing a possible transcript) for a single spoken natural language input. An ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, a similarity of the sound in the spoken natural language input to models for language sounds (e.g., an acoustic model 653 stored in the ASR model storage 652), and the likelihood that a particular word, which matches the sounds, would be included in the sentence at the specific location (e.g., using a language or grammar model 654). Based on the considered factors and the assigned confidence score, the ASR component 550 may output an ASR hypothesis that most likely matches the spoken natural language input, or may output multiple ASR hypotheses in the form of a lattice or an N-best list, with each ASR hypothesis corresponding to a respective score.

The ASR component 550 may interpret a spoken natural language input using one or more models in the ASR model storage 652. Such models may consist of NN-based end-to-end models such as the ASR model 150 previously described. Some models may process the audio data 112 based on the similarity between the spoken natural language input and acoustic units (e.g., representing subword units or phonemes) in an acoustic model 653, and use a language models 654 to predict words/phrases/sentences likely represented by sequences of the acoustic units. In some implementations, a finite state transducer (FST) 655 may perform language model functions.

The ASR component 550 may include a speech recognition engine 658. The ASR component 550 may receive audio data 112 from, for example, a microphone 122 of a device 110. In some cases, the audio data 112 may have been processed audio detected by an AFE 524 or other component. The speech recognition engine 658 may process the audio data 112 using one or more of the ASR model 150, acoustic models 653, language models 654, FST(s) 655, and/or other data models and information for recognizing the speech conveyed in the audio data. The audio data 112 may be audio data that has been digitized (for example by the AFE 524) into frames representing time intervals for which the AFE 524 determines a number of values, called features, representing the qualities of the audio data, along with a set of those values, called a feature vector, representing the features/qualities of the audio data within the frame. In at least some embodiments, audio frames may be 10 ms each. In some embodiments, an audio frame may represent a larger window of audio; for example, ~2 ms. Many different features may be determined, as known in the art, and each feature may represent some quality of the audio that may be useful for ASR processing. A number of approaches may be used by an AFE to process the audio data, such as log-filterbank energies (LFBE), Mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data 112 may arrive at the system 120 encoded, in which case they may be decoded by the speech recognition engine 658 and/or prior to processing by the speech recognition engine 658.

In some implementations, the ASR component 550 may process the audio data 112 using the ASR model 150. The ASR model 150 may be, for example, a recurrent neural network such as an RNN-T. An example RNN-T architecture is illustrated in FIG. 6. The ASR model 150 may predict a probability $(y|x)$ of labels $y=(y_1, \ldots y_u)$ given acoustic features $x=(x_1, \ldots, x_t)$. During inference, the ASR model 150 can generate an N-best list using, for example, a beam search decoding algorithm. The ASR model 150 may include an encoder 610, a prediction network 620, a joint network 630, and a softmax 640. The encoder 610 may be similar or analogous to an acoustic model (e.g., similar to the acoustic model 653 described below), and may process a sequence of acoustic input features to generate encoded hidden representations. The prediction network 620 may be similar or analogous to a language model (e.g., similar to the language model 654 described below), and may process the previous output label predictions, and map them to corresponding hidden representations. The joint network 630 may be, for example, a feed forward NN that may process hidden representations from both the encoder 610 and prediction network 620, and predict output label probabilities. The softmax 640 may be a function implemented (e.g., as a layer of the joint network 630) to normalize the predicted output probabilities.

In some implementations, the speech recognition engine 658 may attempt to match received feature vectors in the audio data 112 to language acoustic units (e.g., phonemes) and words as known in the stored acoustic models 653, language models 654, and/or FST(s) 655. For example, audio data 112 may be processed by one or more acoustic model(s) 653 to determine acoustic unit data. The acoustic unit data may include indicators of acoustic units detected in the audio data 112 by the ASR component 550. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 654 (and/or using FST 655) to determine ASR output data 155. The ASR output data 155 can include one or more hypotheses. One or more of the hypotheses represented in the ASR output data 155 may then be sent to further components (such as the NLU component 560) for further processing as discussed herein. The ASR output data 155 may include representations of text of an utterance, such as words, subword units, or the like.

The speech recognition engine 658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 550 will output ASR hypotheses that make sense grammatically. The specific models used may be general models or may be models corresponding to a particular domain, such as music, banking, etc.

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 658 may use the acoustic model(s) 653 to attempt to match received audio feature vectors to words or subword acoustic units. An acoustic unit may be a senone, phoneme, phoneme in context, syllable, part of a syllable, syllable in context, or any other such portion of a word. The speech recognition engine 658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 550 outputs ASR hypotheses that make sense grammatically.

The speech recognition engine 658 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 658 may also compute scores of branches of the paths based on language models or grammars. Language modeling involves determining scores for what words are likely to be used together to form coherent words and sentences. Application of a language model may improve the likelihood that the ASR component 550 correctly interprets the speech contained in the audio data. For example, for an input audio sounding like "hello," acoustic model processing that returns the potential phoneme paths of "HELO", "HALO", and "YELO" may be adjusted by a language model to adjust the recognition scores of "HELO" (interpreted as the word "hello"), "HALO" (interpreted as the word "halo"), and "YELO" (interpreted as the word "yellow") based on the language context of each word within the spoken utterance.

FIGS. 7 and 8 illustrates how the NLU component 560 may perform NLU processing. FIG. 7 is a conceptual diagram of how natural language processing is performed, according to embodiments of the present disclosure. And FIG. 8 is a conceptual diagram of how natural language processing is performed, according to embodiments of the present disclosure.

FIG. 7 illustrates how NLU processing is performed on text data. The NLU component 560 may process text data including several ASR hypotheses of a single user input. For example, if the ASR component 550 outputs text data including an n-best list of ASR hypotheses, the NLU component 560 may process the text data with respect to all (or a portion of) the ASR hypotheses represented therein.

The NLU component 560 may annotate text data by parsing and/or tagging the text data. For example, for the text data "tell me the weather for Seattle," the NLU component 560 may tag "tell me the weather for Seattle" as an <OutputWeather> intent as well as separately tag "Seattle" as a location for the weather information.

The NLU component 560 may include a shortlister component 750. The shortlister component 750 selects skills that may execute with respect to ASR output data 155 input to the NLU component 560 (e.g., applications that may execute with respect to the user input). The ASR output data 155 (which may also be referred to as ASR data) may include representations of text of an utterance, such as words, subword units, or the like. The shortlister component 750 thus limits downstream, more resource intensive NLU processes to being performed with respect to skills that may execute with respect to the user input.

Without a shortlister component 750, the NLU component 560 may process ASR output data 155 input thereto with respect to every skill of the system, either in parallel, in series, or using some combination thereof. By implementing a shortlister component 750, the NLU component 560 may process ASR output data 155 with respect to only the skills that may execute with respect to the user input. This reduces total compute power and latency attributed to NLU processing.

The shortlister component 750 may include one or more trained models. The model(s) may be trained to recognize various forms of user inputs that may be received by the system(s) 120. For example, during a training period skill system(s) 525 associated with a skill may provide the system(s) 120 with training text data representing sample user inputs that may be provided by a user to invoke the skill. For example, for a ride sharing skill, a skill system(s) 525 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 750 may be trained, using the training text data representing sample user inputs, to determine other potentially related user input structures that users may try to use to invoke the particular skill. During training, the system(s) 120 may solicit the skill system(s) 525 associated with the skill regarding whether the determined other user input structures are permissible, from the perspective of the skill system(s) 525, to be used to invoke the skill. The alternate user input structures may be derived by one or more trained models during model training and/or may be based on user input structures provided by different skills. The skill system(s) 525 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 750 may be trained with respect to a different skill. Alternatively, the shortlister component 750 may use one trained model per domain, such as one trained model for skills associated with a weather domain, one trained model for skills associated with a ride sharing domain, etc.

The system(s) 120 may use the sample user inputs provided by a skill system(s) 525, and related sample user inputs potentially determined during training, as binary examples to train a model associated with a skill associated with the skill system(s) 525. The model associated with the particular skill may then be operated at runtime by the shortlister component 750. For example, some sample user inputs may be positive examples (e.g., user inputs that may be used to invoke the skill). Other sample user inputs may be negative examples (e.g., user inputs that may not be used to invoke the skill).

As described above, the shortlister component 750 may include a different trained model for each skill of the system, a different trained model for each domain, or some other combination of trained model(s). For example, the shortlister component 750 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 750 to output indications of only a portion of the skills that the ASR output data 155 may relate to. For example, a user input may correspond to "tell me about Tom Collins." If the model is clustered based on domain, the shortlister component 750 may determine the user input corresponds to a recipe skill (e.g., a drink recipe) even though the user input may also correspond to an information skill (e.g., including information about a person named Tom Collins).

The NLU component 560 may include one or more recognizers 763. In at least some embodiments, a recognizer 763 may be associated with a skill system 525 (e.g., the recognizer may be configured to interpret text data to correspond to the skill system 525). In at least some other examples, a recognizer 763 may be associated with a domain such as smart home, video, music, weather, custom, etc. (e.g., the recognizer may be configured to interpret text data to correspond to the domain).

If the shortlister component 750 determines ASR output data 155 is potentially associated with multiple domains, the recognizers 763 associated with the domains may process the ASR output data 155, while recognizers 763 not indicated in the shortlister component 750's output may not process the ASR output data 155. The "shortlisted" recognizers 763 may process the ASR output data 155 in parallel, in series, partially in parallel, etc. For example, if ASR output data 155 potentially relates to both a communications domain and a music domain, a recognizer associated with the communications domain may process the ASR output data 155 in parallel, or partially in parallel, with a recognizer associated with the music domain processing the ASR output data 155.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity associated with a domain, associated with the recognizer 763 implementing the NER component 762. The NER component 762 (or other component of the NLU component 560) may also determine whether a word refers to an entity whose identity is not explicitly mentioned in the text data, for example "him," "her," "it" or other anaphora, exophora, or the like.

Each recognizer 763, and more specifically each NER component 762, may be associated with a particular grammar database 776, a particular set of intents/actions 774, and a particular personalized lexicon 786. The grammar databases 776, and intents/actions 774 may be stored in an NLU storage 773. Each gazetteer 784 may include domain/skill-indexed lexical information associated with a particular user and/or device 110. For example, a Gazetteer A (784a) includes skill-indexed lexical information 786aa to 786an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 762 applies grammar information 776 and lexical information 786 associated with a domain (associated with the recognizer 763 implementing the NER component 762) to determine a mention of one or more entities in text data. In this manner, the NER component 762 identifies "slots" (each corresponding to one or more particular words in text data) that may be useful for later processing. The NER component 762 may also label each slot with a type (e.g., noun, place, city, artist name, song name, etc.).

Each grammar database 776 includes the names of entities (i.e., nouns) commonly found in speech about the particular domain to which the grammar database 776 relates, whereas the lexical information 786 is personalized to the user and/or the device 110 from which the user input originated. For example, a grammar database 776 associated with a shopping domain may include a database of words commonly used when people discuss shopping.

A downstream process called entity resolution (discussed in detail elsewhere herein) links a slot of text data to a specific entity known to the system. To perform entity resolution, the NLU component 560 may utilize gazetteer information (784a-784n) stored in an entity library storage 782. The gazetteer information 784 may be used to match text data (representing a portion of the user input) with text data representing known entities, such as song titles, contact names, etc. Gazetteers 784 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 763 may also include an intent classification (IC) component 764. An IC component 764 parses text data to determine an intent(s) (associated with the domain associated with the recognizer 763 implementing the IC component 764) that potentially represents the user input. An intent represents to an action a user desires be performed. An IC component 764 may communicate with a database 774 of words linked to intents. For example, a music intent database may link words and phrases such as "quiet," "volume off," and "mute" to a <Mute> intent. An IC component 764 identifies potential intents by comparing words and phrases in text data (representing at least a portion of the user input) to the words and phrases in an intents database 774 (associated with the domain that is associated with the recognizer 763 implementing the IC component 764).

The intents identifiable by a specific IC component 764 are linked to domain-specific (i.e., the domain associated with the recognizer 763 implementing the IC component 764) grammar frameworks 776 with "slots" to be filled. Each slot of a grammar framework 776 corresponds to a portion of text data that the system believes corresponds to an entity. For example, a grammar framework 776 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786 (associated with the domain associated with the recognizer 763 implementing the NER component 762), attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as Hidden Markov Models, maximum entropy models, log linear models, conditional random fields (CRF), and the like. For example, an NER component 762 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb based on a word database associated with the music domain, which an IC component 764 (also implemented by the music domain recognizer) may determine corresponds to a <PlayMusic> intent. At this stage, no determination has been made as to the meaning of "mother's little helper" or "the rolling stones," but based on grammar rules and models, the NER component 762 has determined the text of these phrases relates to the grammatical object (i.e., entity) of the user input represented in the text data.

An NER component 762 may tag text data to attribute meaning thereto. For example, an NER component 762 may tag "play mother's little helper by the rolling stones" as: {domain} Music, {intent}<PlayMusic>, {artist name} rolling stones, {media type} SONG, and {song title} mother's little helper. For further example, the NER component 762 may tag "play songs by the rolling stones" as: {domain} Music, {intent}<PlayMusic>, {artist name} rolling stones, and {media type} SONG.

The shortlister component 750 may receive ASR output data 155 output from the ASR component 550 or output from the device 110 (as illustrated in FIG. 8). The ASR component 550 may embed the ASR output data 155 into a form processable by a trained model(s) using sentence embedding techniques as known in the art. Sentence embedding results in the ASR output data 155 including text in a structure that enables the trained models of the shortlister component 750 to operate on the ASR output data 155. For example, an embedding of the ASR output data 155 may be a vector representation of the ASR output data 155.

The shortlister component 750 may make binary determinations (e.g., yes or no) regarding which domains relate to the ASR output data 155. The shortlister component 750 may make such determinations using the one or more trained models described herein above. If the shortlister component 750 implements a single trained model for each domain, the shortlister component 750 may simply run the models that are associated with enabled domains as indicated in a user profile associated with the device 110 and/or user that originated the user input.

The shortlister component 750 may generate n-best list data 815 representing domains that may execute with respect to the user input represented in the ASR output data 155. The size of the n-best list represented in the n-best list data 815 is configurable. In an example, the n-best list data 815 may indicate every domain of the system as well as contain an indication, for each domain, regarding whether the domain is likely capable to execute the user input represented in the ASR output data 155. In another example, instead of indicating every domain of the system, the n-best list data 815 may only indicate the domains that are likely to be able to execute the user input represented in the ASR output data 155. In yet another example, the shortlister component 750 may implement thresholding such that the n-best list data 815 may indicate no more than a maximum number of domains that may execute the user input represented in the ASR output data 155. In an example, the threshold number of domains that may be represented in the n-best list data 815 is ten. In another example, the domains included in the n-best list data 815 may be limited by a threshold a score, where only domains indicating a likelihood to handle the user input is above a certain score (as determined by processing the ASR output data 155 by the shortlister component 750 relative to such domains) are included in the n-best list data 815.

The ASR output data 155 may correspond to more than one ASR hypothesis. When this occurs, the shortlister component 750 may output a different n-best list (represented in the n-best list data 815) for each ASR hypothesis. Alternatively, the shortlister component 750 may output a single n-best list representing the domains that are related to the multiple ASR hypotheses represented in the ASR output data 155.

As indicated above, the shortlister component 750 may implement thresholding such that an n-best list output therefrom may include no more than a threshold number of entries. If the ASR output data 155 includes more than one ASR hypothesis, the n-best list output by the shortlister component 750 may include no more than a threshold number of entries irrespective of the number of ASR hypotheses output by the ASR component 550. Alternatively or in addition, the n-best list output by the shortlister component 750 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 155, the shortlister component 750 may generate confidence scores representing likelihoods that domains relate to the ASR output data 155. If the shortlister component 750 implements a different trained model for each domain, the shortlister component 750 may generate a different confidence score for each individual domain trained model that is run. If the shortlister component 750 runs the models of every domain when ASR output data 155 is received, the shortlister component 750 may generate a different confidence score for each domain of the system. If the shortlister component 750 runs the models of only the domains that are associated with skills indicated as enabled in a user profile associated with the device 110 and/or user that originated the user input, the shortlister component 750 may only generate a different confidence score for each domain associated with at least one enabled skill. If the shortlister component 750 implements a single trained model with domain specifically trained portions, the shortlister component 750 may generate a different confidence score for each domain who's specifically trained portion is run. The shortlister component 750 may perform matrix vector modification to obtain confidence scores for all domains of the system in a single instance of processing of the ASR output data 155.

N-best list data 815 including confidence scores that may be output by the shortlister component 750 may be represented as, for example:
Search domain, 0.67
Recipe domain, 0.62
Information domain, 0.57
Shopping domain, 0.42

As indicated, the confidence scores output by the shortlister component 750 may be numeric values. The confidence scores output by the shortlister component 750 may alternatively be binned values (e.g., high, medium, low).

The n-best list may only include entries for domains having a confidence score satisfying (e.g., equaling or exceeding) a minimum threshold confidence score. Alternatively, the shortlister component 750 may include entries for all domains associated with user enabled skills, even if one or more of the domains are associated with confidence scores that do not satisfy the minimum threshold confidence score.

The shortlister component 750 may consider other data 820 when determining which domains may relate to the user input represented in the ASR output data 155 as well as respective confidence scores. The other data 820 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 820 may include an indicator of the user associated with the ASR output data 155, for example as determined by the user recognition component.

The other data 820 may be character embedded prior to being input to the shortlister component 750. The other data 820 may alternatively be embedded using other techniques known in the art prior to being input to the shortlister component 750.

The other data 820 may also include data indicating the domains associated with skills that are enabled with respect to the device 110 and/or user that originated the user input. The shortlister component 750 may use such data to determine which domain-specific trained models to run. That is, the shortlister component 750 may determine to only run the trained models associated with domains that are associated with user-enabled skills. The shortlister component 750 may alternatively use such data to alter confidence scores of domains.

As an example, considering two domains, a first domain associated with at least one enabled skill and a second domain not associated with any user-enabled skills of the user that originated the user input, the shortlister component 750 may run a first model specific to the first domain as well as a second model specific to the second domain. Alternatively, the shortlister component 750 may run a model configured to determine a score for each of the first and second domains. The shortlister component 750 may determine a same confidence score for each of the first and second domains in the first instance. The shortlister component 750 may then alter those confidence scores based on which domains is associated with at least one skill enabled by the present user. For example, the shortlister component 750 may increase the confidence score associated with the domain associated with at least one enabled skill while leaving the confidence score associated with the other domain the same. Alternatively, the shortlister component 750 may leave the confidence score associated with the domain associated with at least one enabled skill the same while decreasing the confidence score associated with the other domain. Moreover, the shortlister component 750 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 570. When the shortlister component 750 receives the ASR output data 155, the shortlister component 750 may determine whether profile data associated with the user and/or device 110 that originated the command includes an indication of enabled skills.

The other data 820 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 750 may use such data to determine which domain-specific trained models to run. For example, if the device 110 corresponds to a displayless type device, the shortlister component 750 may determine not to run trained models specific to domains that output video data. The shortlister component 750 may alternatively use such data to alter confidence scores of domains.

As an example, considering two domains, one that outputs audio data and another that outputs video data, the shortlister component 750 may run a first model specific to the domain that generates audio data as well as a second model specific to the domain that generates video data. Alternatively the shortlister component 750 may run a model configured to determine a score for each domain. The shortlister component 750 may determine a same confidence score for each of the domains in the first instance. The shortlister component 750 may then alter the original confidence scores based on the type of the device 110 that originated the user input corresponding to the ASR output data 155. For example, if the device 110 is a displayless device, the shortlister component 750 may increase the confidence score associated with the domain that generates audio data while leaving the confidence score associated with the domain that generates video data the same. Alternatively, if the device 110 is a displayless device, the shortlister component 750 may leave the confidence score associated with the domain that generates audio data the same while decreasing the confidence score associated with the domain that generates video data. Moreover, if the device 110 is a displayless device, the shortlister component 750 may increase the confidence score associated with the domain that generates audio data as well as decrease the confidence score associated with the domain that generates video data.

The type of device information represented in the other data 820 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 820 may represent the smart TV of other display device, and not the displayless device that captured the spoken user input.

The other data 820 may also include data indicating the user input originating device's speed, location, or other mobility information. For example, the device may correspond to a vehicle including a display. If the vehicle is moving, the shortlister component 750 may decrease the confidence score associated with a domain that generates video data as it may be undesirable to output video content to a user while the user is driving. The device may output data to the system(s) 120 indicating when the device is moving.

The other data 820 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 750 may use such data to alter confidence scores of domains. For example, the shortlister component 750 may run a first model specific to a first domain as well as a second model specific to a second domain. Alternatively, the shortlister component 750 may run a model configured to determine a score for each domain. The shortlister component 750 may also determine a same confidence score for each of the domains in the first instance. The shortlister component 750 may then alter the original confidence scores based on the first domain being invoked to cause the system to output content while the current user input was received. Based on the first domain being invoked, the shortlister component 750 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 815 generated by the shortlister component 750 as well as the different types of other data 820 considered by the shortlister component 750 are configurable. For example, the shortlister component 750 may update confidence scores as more other data 820 is considered. For further example, the n-best list data 815 may exclude relevant domains if thresholding is implemented. Thus, for example, the shortlister component 750 may include an indication of a domain in the n-best list 815 unless the shortlister component 750 is one hundred percent confident that the domain may not execute the user input represented in the ASR output data 155 (e.g., the shortlister component 750 determines a confidence score of zero for the domain).

The shortlister component 750 may send the ASR output data 155 to recognizers 763 associated with domains represented in the n-best list data 815. Alternatively, the shortlister component 750 may send the n-best list data 815 or some other indicator of the selected subset of domains to another component (such as the orchestrator component 530) which may in turn send the ASR output data 155 to the recognizers 763 corresponding to the domains included in the n-best list data 815 or otherwise indicated in the indicator. If the shortlister component 750 generates an n-best list representing domains without any associated confidence scores, the shortlister component 750/orchestrator component 530 may send the ASR output data 155 to recognizers 763 associated with domains that the shortlister component 750 determines may execute the user input. If the shortlister component 750 generates an n-best list representing domains with associated confidence scores, the shortlister component 750/orchestrator component 530 may send the ASR output data 155 to recognizers 763 associated with domains associated with confidence scores satisfying (e.g., meeting or exceeding) a threshold minimum confidence score.

A recognizer 763 may output tagged text data generated by an NER component 762 and an IC component 764, as described herein above. The NLU component 560 may compile the output tagged text data of the recognizers 763 into a single cross-domain n-best list 840 and may send the cross-domain n-best list 840 to a pruning component 850. Each entry of tagged text (e.g., each NLU hypothesis) represented in the cross-domain n-best list data 840 may be associated with a respective score indicating a likelihood that the NLU hypothesis corresponds to the domain associated with the recognizer 763 from which the NLU hypothesis was output. For example, the cross-domain n-best list data 840 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 850 may sort the NLU hypotheses represented in the cross-domain n-best list data 840 according to their respective scores. The pruning component 850 may perform score thresholding with respect to the cross-domain NLU hypotheses. For example, the pruning component 850 may select NLU hypotheses associated with scores satisfying (e.g., meeting and/or exceeding) a threshold score. The pruning component 850 may also or alternatively perform number of NLU hypothesis thresholding. For example, the pruning component 850 may select the top scoring NLU hypothesis(es). The pruning component 850 may output a portion of the NLU hypotheses input thereto. The purpose of the pruning component 850 is to create a reduced list of NLU hypotheses so that downstream, more resource intensive, processes may only operate on the NLU hypotheses that most likely represent the user's intent.

The NLU component 560 may include a light slot filler component 852. The light slot filler component 852 can take text from slots represented in the NLU hypotheses output by the pruning component 850 and alter them to make the text more easily processed by downstream components. The light slot filler component 852 may perform low latency operations that do not involve heavy operations such as reference to a knowledge base (e.g., 772. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-domain n-best list data 860.

The cross-domain n-best list data 860 may be input to an entity resolution component 870. The entity resolution component 870 can apply rules or other instructions to standardize labels or tokens from previous stages into an intent/slot representation. The precise transformation may depend on the domain. For example, for a travel domain, the entity resolution component 870 may transform text corresponding to "Boston airport" to the standard BOS three-letter code referring to the airport. The entity resolution component 870 can refer to a knowledge base (e.g., 772) that is used to specifically identify the precise entity referred to in each slot of each NLU hypothesis represented in the cross-domain n-best list data 860. Specific intent/slot combinations may also be tied to a particular source, which may then be used to resolve the text. In the example "play songs by the stones," the entity resolution component 870 may reference a personal music catalog, Amazon Music account, a user profile, or the like. The entity resolution component 870 may output an altered n-best list that is based on the cross-domain n-best list 860 but that includes more detailed information (e.g., entity IDs) about the specific entities mentioned in the slots and/or more detailed slot data that can eventually be used by a skill. The NLU component 560 may include multiple entity resolution components 870 and each entity resolution component 870 may be specific to one or more domains.

The NLU component 560 may include a reranker 890. The reranker 890 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 870.

The reranker 890 may apply re-scoring, biasing, or other techniques. The reranker 890 may consider not only the data output by the entity resolution component 870, but may also consider other data 891. The other data 891 may include a variety of information. For example, the other data 891 may include skill rating or popularity data. For example, if one skill has a high rating, the reranker 890 may increase the score of a NLU hypothesis that may be processed by the skill. The other data 891 may also include information about skills that have been enabled by the user that originated the user input. For example, the reranker 890 may assign higher scores to NLU hypothesis that may be processed by enabled skills than NLU hypothesis that may be processed by non-enabled skills. The other data 891 may also include data indicating user usage history, such as if the user that originated the user input regularly uses a particular skill or does so at particular times of day. The other data 891 may additionally include data indicating date, time, location, weather, type of device 110, user identifier, context, as well as other information. For example, the reranker 890 may consider when any particular skill is currently active (e.g., music being played, a game being played, etc.).

As illustrated and described, the entity resolution component 870 is implemented prior to the reranker 890. The entity resolution component 870 may alternatively be implemented after the reranker 890. Implementing the entity resolution component 870 after the reranker 890 limits the NLU hypotheses processed by the entity resolution component 870 to only those hypotheses that successfully pass through the reranker 890.

The reranker 890 may be a global reranker (e.g., one that is not specific to any particular domain). Alternatively, the NLU component 560 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 560 may perform NLU processing described above with respect to domains associated with skills wholly implemented as part of the system(s) 120 (e.g., designated 590 in FIG. 5). The NLU component 560 may separately perform NLU processing described above with respect to domains associated with skills that are at least partially implemented as part of the skill system(s) 525. In an example, the shortlister component 750 may only process with respect to these latter domains. Results of these two NLU processing paths may be merged into NLU results data 885, which may be sent to a post-NLU ranker 865, which may be implemented by the system(s) 120.

The post-NLU ranker 865 may include a statistical component that produces a ranked list of intent/skill pairs with associated confidence scores. Each confidence score may indicate an adequacy of the skill's execution of the intent with respect to NLU results data associated with the skill. The post-NLU ranker 865 may operate one or more trained models configured to process the NLU results data 885, skill result data 830, and the other data 820 in order to output ranked output data 825. The ranked output data 825 may include an n-best list where the NLU hypotheses in the NLU results data 885 are reordered such that the n-best list in the ranked output data 825 represents a prioritized list of skills to respond to a user input as determined by the post-NLU ranker 865. The ranked output data 825 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 865 enables the system to better determine the best skill to execute the user input. For example, first and second NLU hypotheses in the NLU results data 885 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 865 (or other scheduling component such as orchestrator component 530) may solicit the first skill and the second skill to provide potential result data 830 based on the first NLU hypothesis and the second NLU hypothesis, respectively. For example, the post-NLU ranker 865 may send the first NLU hypothesis to the first skill 590a along with a request for the first skill 590a to at least partially execute with respect to the first NLU hypothesis. The post-NLU ranker 865 may also send the second NLU hypothesis to the second skill 590b along with a request for the second skill 590b to at least partially execute with respect to the second NLU hypothesis. The post-NLU ranker 865 receives, from the first skill 590a, first result data 830a generated from the first skill 590a's execution with respect to the first NLU hypothesis. The post-NLU ranker 865 also receives, from the second skill 590b, second results data 830b generated from the second skill 590b's execution with respect to the second NLU hypothesis.

The result data 830 may include various portions. For example, the result data 830 may include content (e.g., audio data, text data, and/or video data) to be output to a user. The result data 830 may also include a unique identifier used by the system(s) 120 and/or the skill system(s) 525 to locate the data to be output to a user. The result data 830 may also include an instruction. For example, if the user input corresponds to "turn on the light," the result data 830 may include an instruction causing the system to turn on a light associated with a profile of the device (110a/110b) and/or user.

The post-NLU ranker 865 may consider the first result data 830a and the second result data 830b to alter the first confidence score and the second confidence score of the first NLU hypothesis and the second NLU hypothesis, respectively. That is, the post-NLU ranker 865 may generate a third confidence score based on the first result data 830a and the first confidence score. The third confidence score may correspond to how likely the post-NLU ranker 865 determines the first skill will correctly respond to the user input. The post-NLU ranker 865 may also generate a fourth confidence score based on the second result data 830b and the second confidence score. One skilled in the art will appreciate that a first difference between the third confidence score and the fourth confidence score may be greater than a second difference between the first confidence score and the second confidence score. The post-NLU ranker 865 may also consider the other data 820 to generate the third confidence score and the fourth confidence score. While it has been described that the post-NLU ranker 865 may alter the confidence scores associated with first and second NLU hypotheses, one skilled in the art will appreciate that the post-NLU ranker 865 may alter the confidence scores of more than two NLU hypotheses. The post-NLU ranker 865 may select the result data 830 associated with the skill 590 with the highest altered confidence score to be the data output in response to the current user input. The post-NLU ranker 865 may also consider the ASR output data 155 to alter the NLU hypotheses confidence scores.

The orchestrator component 530 may, prior to sending the NLU results data 885 to the post-NLU ranker 865, associate intents in the NLU hypotheses with skills 590. For example, if a NLU hypothesis includes a <PlayMusic> intent, the orchestrator component 530 may associate the NLU hypothesis with one or more skills 590 that can execute the <PlayMusic> intent. Thus, the orchestrator component 530 may send the NLU results data 885, including NLU hypotheses paired with skills 590, to the post-NLU ranker 865. In response to ASR output data 155 corresponding to "what should I do for dinner today," the orchestrator component 530 may generates pairs of skills 590 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 865 queries each skill 590, paired with a NLU hypothesis in the NLU results data 885, to provide result data 830 based on the NLU hypothesis with which it is associated. That is, with respect to each skill, the post-NLU ranker 865 colloquially asks the skill "if given this NLU hypothesis, what would you do with it." According to the above example, the post-NLU ranker 865 may send skills 590 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 865 may query each of the skills 590 in parallel or substantially in parallel.

A skill 590 may provide the post-NLU ranker 865 with various data and indications in response to the post-NLU ranker 865 soliciting the skill 590 for result data 830. A skill 590 may simply provide the post-NLU ranker 865 with an indication of whether or not the skill can execute with respect to the NLU hypothesis it received. A skill 590 may also or alternatively provide the post-NLU ranker 865 with output data generated based on the NLU hypothesis it received. In some situations, a skill 590 may need further information in addition to what is represented in the received NLU hypothesis to provide output data responsive to the user input. In these situations, the skill 590 may provide the post-NLU ranker 865 with result data 830 indicating slots of a framework that the skill 590 further needs filled or entities that the skill 590 further needs resolved prior to the skill 590 being able to provided result data 830 responsive to the user input. The skill 590 may also provide the post-NLU ranker 865 with an instruction and/or computer-generated speech indicating how the skill 590 recommends the system solicit further information needed by the skill 590. The skill 590 may further provide the post-NLU ranker 865 with an indication of whether the skill 590 will have all needed information after the user provides additional information a single time, or whether the skill 590 will need the user to provide various kinds of additional information prior to the skill 590 having all needed information. According to the above example, skills 590 may provide the post-NLU ranker 865 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 830 includes an indication provided by a skill 590 indicating whether or not the skill 590 can execute with respect to a NLU hypothesis; data generated by a skill 590 based on a NLU hypothesis; as well as an indication provided by a skill 590 indicating the skill 590 needs further information in addition to what is represented in the received NLU hypothesis.

The post-NLU ranker 865 uses the result data 830 provided by the skills 590 to alter the NLU processing confidence scores generated by the reranker 890. That is, the post-NLU ranker 865 uses the result data 830 provided by the queried skills 590 to create larger differences between the NLU processing confidence scores generated by the reranker 890. Without the post-NLU ranker 865, the system may not be confident enough to determine an output in response to a user input, for example when the NLU hypotheses associated with multiple skills are too close for the system to confidently determine a single skill 590 to invoke to respond to the user input. For example, if the system does not implement the post-NLU ranker 865, the system may not be able to determine whether to obtain output data from a general reference information skill or a medical information skill in response to a user input corresponding to "what is acne."

The post-NLU ranker 865 may prefer skills 590 that provide result data 830 responsive to NLU hypotheses over skills 590 that provide result data 830 corresponding to an indication that further information is needed, as well as skills 590 that provide result data 830 indicating they can provide multiple responses to received NLU hypotheses. For example, the post-NLU ranker 865 may generate a first score for a first skill 590*a* that is greater than the first skill's NLU confidence score based on the first skill 590*a* providing result data 830*a* including a response to a NLU hypothesis. For further example, the post-NLU ranker 865 may generate a second score for a second skill 590*b* that is less than the second skill's NLU confidence score based on the second skill 590*b* providing result data 830*b* indicating further information is needed for the second skill 590*b* to provide a response to a NLU hypothesis. Yet further, for example, the post-NLU ranker 865 may generate a third score for a third skill 590*c* that is less than the third skill's NLU confidence score based on the third skill 590*c* providing result data 830*c* indicating the third skill 590*c* can provide multiple responses to a NLU hypothesis.

The post-NLU ranker 865 may consider other data 820 in determining scores. The other data 820 may include rankings associated with the queried skills 590. A ranking may be a system ranking or a user-specific ranking. A ranking may indicate a veracity of a skill from the perspective of one or more users of the system. For example, the post-NLU ranker 865 may generate a first score for a first skill 590*a* that is greater than the first skill's NLU processing confidence score based on the first skill 590*a* being associated with a high ranking. For further example, the post-NLU ranker 865 may generate a second score for a second skill 590*b* that is less than the second skill's NLU processing confidence score based on the second skill 590*b* being associated with a low ranking.

The other data 820 may include information indicating whether or not the user that originated the user input has enabled one or more of the queried skills 590. For example, the post-NLU ranker 865 may generate a first score for a first skill 590*a* that is greater than the first skill's NLU processing confidence score based on the first skill 590*a* being enabled by the user that originated the user input. For further example, the post-NLU ranker 865 may generate a second score for a second skill 590*b* that is less than the second skill's NLU processing confidence score based on the second skill 590*b* not being enabled by the user that originated the user input. When the post-NLU ranker 865 receives the NLU results data 885, the post-NLU ranker 865 may determine whether profile data, associated with the user and/or device that originated the user input, includes indications of enabled skills.

The other data 820 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 865 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 865 may increase the NLU processing confidence score associated with a first skill configured to output visual data and/or decrease the NLU processing confidence score associated with a second skill configured to output audio data.

The other data 820 may include information indicating the veracity of the result data 830 provided by a skill 590. For example, if a user says "tell me a recipe for pasta sauce," a first skill 590a may provide the post-NLU ranker 865 with first result data 830a corresponding to a first recipe associated with a five star rating and a second skill 590b may provide the post-NLU ranker 865 with second result data 830b corresponding to a second recipe associated with a one star rating. In this situation, the post-NLU ranker 865 may increase the NLU processing confidence score associated with the first skill 590a based on the first skill 590a providing the first result data 830a associated with the five star rating and/or decrease the NLU processing confidence score associated with the second skill 590b based on the second skill 590b providing the second result data 830b associated with the one star rating.

The other data 820 may include information indicating the type of device that originated the user input. For example, the device may correspond to a "hotel room" type if the device is located in a hotel room. If a user inputs a command corresponding to "order me food" to the device located in the hotel room, the post-NLU ranker 865 may increase the NLU processing confidence score associated with a first skill 590a corresponding to a room service skill associated with the hotel and/or decrease the NLU processing confidence score associated with a second skill 590b corresponding to a food skill not associated with the hotel.

The other data 820 may include information indicating a location of the device and/or user that originated the user input. The system may be configured with skills 590 that may only operate with respect to certain geographic locations. For example, a user may provide a user input corresponding to "when is the next train to Portland." A first skill 590a may operate with respect to trains that arrive at, depart from, and pass through Portland, Oregon. A second skill 590b may operate with respect to trains that arrive at, depart from, and pass through Portland, Maine. If the device and/or user that originated the user input is located in Seattle, Washington, the post-NLU ranker 865 may increase the NLU processing confidence score associated with the first skill 590a and/or decrease the NLU processing confidence score associated with the second skill 590b. Likewise, if the device and/or user that originated the user input is located in Boston, Massachusetts, the post-NLU ranker 865 may increase the NLU processing confidence score associated with the second skill 590b and/or decrease the NLU processing confidence score associated with the first skill 590a.

The other data 820 may include information indicating a time of day. The system may be configured with skills 590 that operate with respect to certain times of day. For example, a user may provide a user input corresponding to "order me food." A first skill 590a may generate first result data 830a corresponding to breakfast. A second skill 590b may generate second result data 830b corresponding to dinner. If the system(s) 120 receives the user input in the morning, the post-NLU ranker 865 may increase the NLU processing confidence score associated with the first skill 590a and/or decrease the NLU processing score associated with the second skill 590b. If the system(s) 120 receives the user input in the afternoon or evening, the post-NLU ranker 865 may increase the NLU processing confidence score associated with the second skill 590b and/or decrease the NLU processing confidence score associated with the first skill 590a.

The other data 820 may include information indicating user preferences. The system may include multiple skills 590 configured to execute in substantially the same manner. For example, a first skill 590a and a second skill 590b may both be configured to order food from respective restaurants. The system may store a user preference (e.g., in the profile storage 570) that is associated with the user that provided the user input to the system(s) 120 as well as indicates the user prefers the first skill 590a over the second skill 590b. Thus, when the user provides a user input that may be executed by both the first skill 590a and the second skill 590b, the post-NLU ranker 865 may increase the NLU processing confidence score associated with the first skill 590a and/or decrease the NLU processing confidence score associated with the second skill 590b.

The other data 820 may include information indicating system usage history associated with the user that originated the user input. For example, the system usage history may indicate the user originates user inputs that invoke a first skill 590a more often than the user originates user inputs that invoke a second skill 590b. Based on this, if the present user input may be executed by both the first skill 590a and the second skill 590b, the post-NLU ranker 865 may increase the NLU processing confidence score associated with the first skill 590a and/or decrease the NLU processing confidence score associated with the second skill 590b.

The other data 820 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 865 may increase the NLU processing confidence score associated with a first skill 590a that generates audio data. The post-NLU ranker 865 may also or alternatively decrease the NLU processing confidence score associated with a second skill 590b that generates image data or video data.

The other data 820 may include information indicating how long it took a skill 590 to provide result data 830 to the post-NLU ranker 865. When the post-NLU ranker 865 multiple skills 590 for result data 830, the skills 590 may respond to the queries at different speeds. The post-NLU ranker 865 may implement a latency budget. For example, if the post-NLU ranker 865 determines a skill 590 responds to the post-NLU ranker 865 within a threshold amount of time from receiving a query from the post-NLU ranker 865, the post-NLU ranker 865 may increase the NLU processing confidence score associated with the skill 590. Conversely, if the post-NLU ranker 865 determines a skill 590 does not respond to the post-NLU ranker 865 within a threshold amount of time from receiving a query from the post-NLU ranker 865, the post-NLU ranker 865 may decrease the NLU processing confidence score associated with the skill 590.

It has been described that the post-NLU ranker 865 uses the other data 820 to increase and decrease NLU processing confidence scores associated with various skills 590 that the post-NLU ranker 865 has already requested result data from. Alternatively, the post-NLU ranker 865 may use the other data 820 to determine which skills 590 to request result data from. For example, the post-NLU ranker 865 may use the other data 820 to increase and/or decrease NLU processing confidence scores associated with skills 590 associated with the NLU results data 885 output by the NLU component 560. The post-NLU ranker 865 may select n-number of top scoring altered NLU processing confidence scores. The post-NLU ranker 865 may then request result data 830 from only the skills 590 associated with the selected n-number of NLU processing confidence scores.

As described, the post-NLU ranker 865 may request result data 830 from all skills 590 associated with the NLU results data 885 output by the NLU component 560. Alternatively, the system(s) 120 may prefer result data 830 from skills implemented entirely by the system(s) 120 rather than skills at least partially implemented by the skill system(s) 525. Therefore, in the first instance, the post-NLU ranker 865 may request result data 830 from only skills associated with the NLU results data 885 and entirely implemented by the system(s) 120. The post-NLU ranker 865 may only request result data 830 from skills associated with the NLU results data 885, and at least partially implemented by the skill system(s) 525, if none of the skills, wholly implemented by the system(s) 120, provide the post-NLU ranker 865 with result data 830 indicating either data response to the NLU results data 885, an indication that the skill can execute the user input, or an indication that further information is needed.

As indicated above, the post-NLU ranker 865 may request result data 830 from multiple skills 590. If one of the skills 590 provides result data 830 indicating a response to a NLU hypothesis and the other skills provide result data 830 indicating either they cannot execute or they need further information, the post-NLU ranker 865 may select the result data 830 including the response to the NLU hypothesis as the data to be output to the user. If more than one of the skills 590 provides result data 830 indicating responses to NLU hypotheses, the post-NLU ranker 865 may consider the other data 820 to generate altered NLU processing confidence scores, and select the result data 830 of the skill associated with the greatest score as the data to be output to the user.

A system that does not implement the post-NLU ranker 865 may select the highest scored NLU hypothesis in the NLU results data 885. The system may send the NLU hypothesis to a skill 590 associated therewith along with a request for output data. In some situations, the skill 590 may not be able to provide the system with output data. This results in the system indicating to the user that the user input could not be processed even though another skill associated with lower ranked NLU hypothesis could have provided output data responsive to the user input.

The post-NLU ranker 865 reduces instances of the aforementioned situation. As described, the post-NLU ranker 865 queries multiple skills associated with the NLU results data 885 to provide result data 830 to the post-NLU ranker 865 prior to the post-NLU ranker 865 ultimately determining the skill 590 to be invoked to respond to the user input. Some of the skills 590 may provide result data 830 indicating responses to NLU hypotheses while other skills 590 may providing result data 830 indicating the skills cannot provide responsive data. Whereas a system not implementing the post-NLU ranker 865 may select one of the skills 590 that could not provide a response, the post-NLU ranker 865 only selects a skill 590 that provides the post-NLU ranker 865 with result data corresponding to a response, indicating further information is needed, or indicating multiple responses can be generated.

The post-NLU ranker 865 may select result data 830, associated with the skill 590 associated with the highest score, for output to the user. Alternatively, the post-NLU ranker 865 may output ranked output data 825 indicating skills 590 and their respective post-NLU ranker rankings. Since the post-NLU ranker 865 receives result data 830, potentially corresponding to a response to the user input, from the skills 590 prior to post-NLU ranker 865 selecting one of the skills or outputting the ranked output data 825, little to no latency occurs from the time skills provide result data 830 and the time the system outputs responds to the user.

If the post-NLU ranker 865 selects result audio data to be output to a user and the system determines content should be output audibly, the post-NLU ranker 865 (or another component of the system(s) 120) may cause the device 110a and/or the device 110b to output audio corresponding to the result audio data. If the post-NLU ranker 865 selects result text data to output to a user and the system determines content should be output visually, the post-NLU ranker 865 (or another component of the system(s) 120) may cause the device 110b to display text corresponding to the result text data. If the post-NLU ranker 865 selects result audio data to output to a user and the system determines content should be output visually, the post-NLU ranker 865 (or another component of the system(s) 120) may send the result audio data to the ASR component 550. The ASR component 550 may generate output text data corresponding to the result audio data. The system(s) 120 may then cause the device 110b to display text corresponding to the output text data. If the post-NLU ranker 865 selects result text data to output to a user and the system determines content should be output audibly, the post-NLU ranker 865 (or another component of the system(s) 120) may send the result text data to the TTS system 580. The TTS system 580 may generate output audio data (corresponding to computer-generated speech) based on the result text data. The system(s) 120 may then cause the device 110a and/or the device 110b to output audio corresponding to the output audio data.

As described, a skill 590 may provide result data 830 either indicating a response to the user input, indicating more information is needed for the skill 590 to provide a response to the user input, or indicating the skill 590 cannot provide a response to the user input. If the skill 590 associated with the highest post-NLU ranker score provides the post-NLU ranker 865 with result data 830 indicating a response to the user input, the post-NLU ranker 865 (or another component of the system(s) 120, such as the orchestrator component 530) may simply cause content corresponding to the result data 830 to be output to the user. For example, the post-NLU ranker 865 may send the result data 830 to the orchestrator component 530. The orchestrator component 530 may cause the result data 830 to be sent to the device (110a/110b), which may output audio and/or display text corresponding to the result data 830. The orchestrator component 530 may send the result data 830 to the ASR component 550 to generate output text data and/or may send the result data 830 to the TTS system 580 to generate output audio data, depending on the situation.

The skill 590 associated with the highest post-NLU ranker score may provide the post-NLU ranker 865 with result data 830 indicating more information is needed as well as instruction data. The instruction data may indicate how the skill 590 recommends the system obtain the needed information. For example, the instruction data may correspond to text data or audio data (i.e., computer-generated speech) corresponding to "please indicate." _____. The instruction data may be in a format (e.g., text data or audio data) capable of being output by the device (110a/110b). When this occurs, the post-NLU ranker 865 may simply cause the received instruction data to be output by the device (110a/110b). Alternatively, the instruction data may be in a format that is not capable of being output by the device (110a/110b). When this occurs, the post-NLU ranker 865 may cause the ASR component 550 or the TTS system 580 to process the instruction data, depending on the situation, to generate instruction data that may be output by the device (110a/110b). Once the user provides the system with all further information needed by the skill 590, the skill 590 may provide the system with result data 830 indicating a response to the user input, which may be output by the system as detailed above.

The system may include "informational" skills 590 that simply provide the system with information, which the system outputs to the user. The system may also include "transactional" skills 590 that require a system instruction to execute the user input. Transactional skills 590 include ride sharing skills, flight booking skills, etc. A transactional skill 590 may simply provide the post-NLU ranker 865 with result data 830 indicating the transactional skill 590 can execute the user input. The post-NLU ranker 865 may then cause the system to solicit the user for an indication that the system is permitted to cause the transactional skill 590 to execute the user input. The user-provided indication may be an audible indication or a tactile indication (e.g., activation of a virtual button or input of text via a virtual keyboard). In response to receiving the user-provided indication, the system may provide the transactional skill 590 with data corresponding to the indication. In response, the transactional skill 590 may execute the command (e.g., book a flight, book a train ticket, etc.). Thus, while the system may not further engage an informational skill 590 after the informational skill 590 provides the post-NLU ranker 865 with result data 830, the system may further engage a transactional skill 590 after the transactional skill 590 provides the post-NLU ranker 865 with result data 830 indicating the transactional skill 590 may execute the user input.

In some instances, the post-NLU ranker 865 may generate respective scores for first and second skills that are too close (e.g., are not different by at least a threshold difference) for the post-NLU ranker 865 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 530, post-NLU ranker 865, shortlister 750, or other component may be trained and operated according to various machine learning techniques.

FIG. 9 is a conceptual diagram that illustrates operations for generating synthesized speech using a text-to-speech system 580, according to embodiments of the present disclosure. The TTS system 580 may receive text data 915 and process it using one or more TTS models 980 retrieved from a voice profile storage 935. A TTS model 980 may be a model trained and/or configured to reproduce certain voice characteristics (e.g., to sound like a particular user or character, to convey a particular emotion or emphasis, or to represent a particular speaking style such as sports commentary or book reading). The TTS model 980 may process the text data 915 to generate synthesized speech in the form of spectrogram data 945 (e.g., Mel-spectrograms). A vocoder 990 may convert the spectrogram data 945 into output speech audio data 995, which may represent a time-domain waveform suitable for amplification and output as audio (e.g., from a loudspeaker).

The TTS system 580 may additionally receive other input data 925. The other input data 925 may include, for example, identifiers and/or labels corresponding to a desired speaker identity, voice characteristics, emotion, speech style, etc. desired for the synthesized speech. In some implementations, the other input data 925 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 915 and/or the other input data 925 such as metadata accompanying a TTS request and indicating what text should be whispered (or have some other indicated audio characteristic).

The TTS system 580 may include a preprocessing component 920 that can convert the text data 915 and/or other input data 925 into a form suitable for processing by the TTS model 480. The text data 915 may be from, for example an application, a skill component (described further below), an NLG component, another device or source, or may be input by a user. The text data 915 received by the TTS system 580 may not necessarily be text, but may include other data (such as symbols, code, other data, etc.) that may reference text (such as an indicator of a word and/or phoneme) that is to be synthesized. The preprocessing component 920 may transform the text data 915 into, for example, a symbolic linguistic representation, which may include linguistic context features such as phoneme data, punctuation data, syllable-level features, word-level features, and/or emotion, speaker, accent, or other features for processing by the TTS system 580. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 915, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 920 may include functionality and/or components for performing text normalization, linguistic analysis, linguistic prosody generation, or other such operations. During text normalization, the preprocessing component 920 may first process the text data 915 and generate standard text, converting such things as numbers, abbreviations (such as Apt., St., etc.), symbols ($, %, etc.) into the equivalent of written out words.

During linguistic analysis, the preprocessing component 920 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 480 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 920 may also identify different grammatical components such as prefixes, suffixes, phrases, punctuation, syntactic boundaries, or the like. Such grammatical components may be used by the TTS system 580 to craft a natural-sounding audio waveform output. The language dictionary may also include letter-to-sound rules and other tools that may be used to pronounce previously unidentified words or letter combinations that may be encountered by the TTS system 580. Generally, the more information included in the language dictionary, the higher quality the speech output.

The output of the preprocessing component 920 may be a symbolic linguistic representation, which may include a sequence of phonetic units. In some implementations, the sequence of phonetic units may be annotated with prosodic characteristics. In some implementations, prosody may be applied in part or wholly by a TTS model 480. This symbolic linguistic representation may be sent to the TTS model 480 for conversion into audio data (e.g., in the form of Mel-spectrograms or other frequency content data format).

The TTS system 580 may retrieve one or more previously trained and/or configured TTS models 480 from the voice profile storage 935. A TTS model 480 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 480 may be stored in the voice profile storage 935. A TTS model 480 may represent a particular speaker identity and may be conditioned based on speaking style, emotion, etc. In some implementations, a particular speaker identity may be associated with more than one TTS model 480; for example, with a different model representing a different speaking style, language, emotion, etc. in some implementations, a particular TTS model 480 may be associated with more than one speaker identity; that is, be able to produce synthesized speech that reproduces voice characteristics of more than one character. In some cases, the TTS model 480 may generate the desired voice characteristics based on conditioning data received or determined from the text data 915 and/or the other input data 925.

The TTS system 580 may, based on an indication received with the text data 915 and/or other input data 925, retrieve a TTS model 480 from the voice profile storage 935 and use it to process input to generate synthesized speech. The TTS system 580 may provide the TTS model 480 with any relevant conditioning labels to generate synthesized speech having the desired voice characteristics. The TTS model 480 may generate spectrogram data 945 (e.g., frequency content data) representing the synthesized speech, and send it to the vocoder 990 for conversion into an audio signal.

The TTS system 580 may generate other output data 555. The other output data 555 may include, for example, indications or instructions for handling and/or outputting the synthesized speech. For example, the text data 915 and/or other input data 925 may be received along with metadata, such as SSML tags, indicating that a selected portion of the text data 915 should be louder or quieter. Thus, the other output data 555 may include a volume tag that instructs the vocoder 990 to increase or decrease an amplitude of the output speech audio data 995 at times corresponding to the selected portion of the text data 915. Additionally or alternatively, a volume tag may instruct a playback device to raise or lower a volume of the synthesized speech from the device's current volume level, or lower a volume of other media being output by the device (e.g., to deliver an urgent message).

The vocoder 990 may convert the spectrogram data 945 generated by the TTS model 480 into an audio signal (e.g., an analog or digital time-domain waveform) suitable for amplification and output as audio. The vocoder 990 may be, for example, a universal neural vocoder based on Parallel WaveNet or related model. The vocoder 990 may take as input audio data in the form of, for example, a Mel-spectrogram with 80 coefficients and frequencies ranging from 50 Hz to 12 kHz. The speech audio data 995 may be a time-domain audio format (e.g., pulse-code modulation (PCM), waveform audio format (WAV), u-law, etc.) that may be readily converted to an analog signal for amplification and output by a loudspeaker, such as the loudspeaker 1012 shown in FIG. 10. The speech audio data 995 may consist of, for example, 8-, 16-, or 24-bit audio having a sample rate of 16 kHz, 24 kHz, 44.1 kHz, etc. In some implementations, other bit and/or sample rates may be used.

Figure 10:
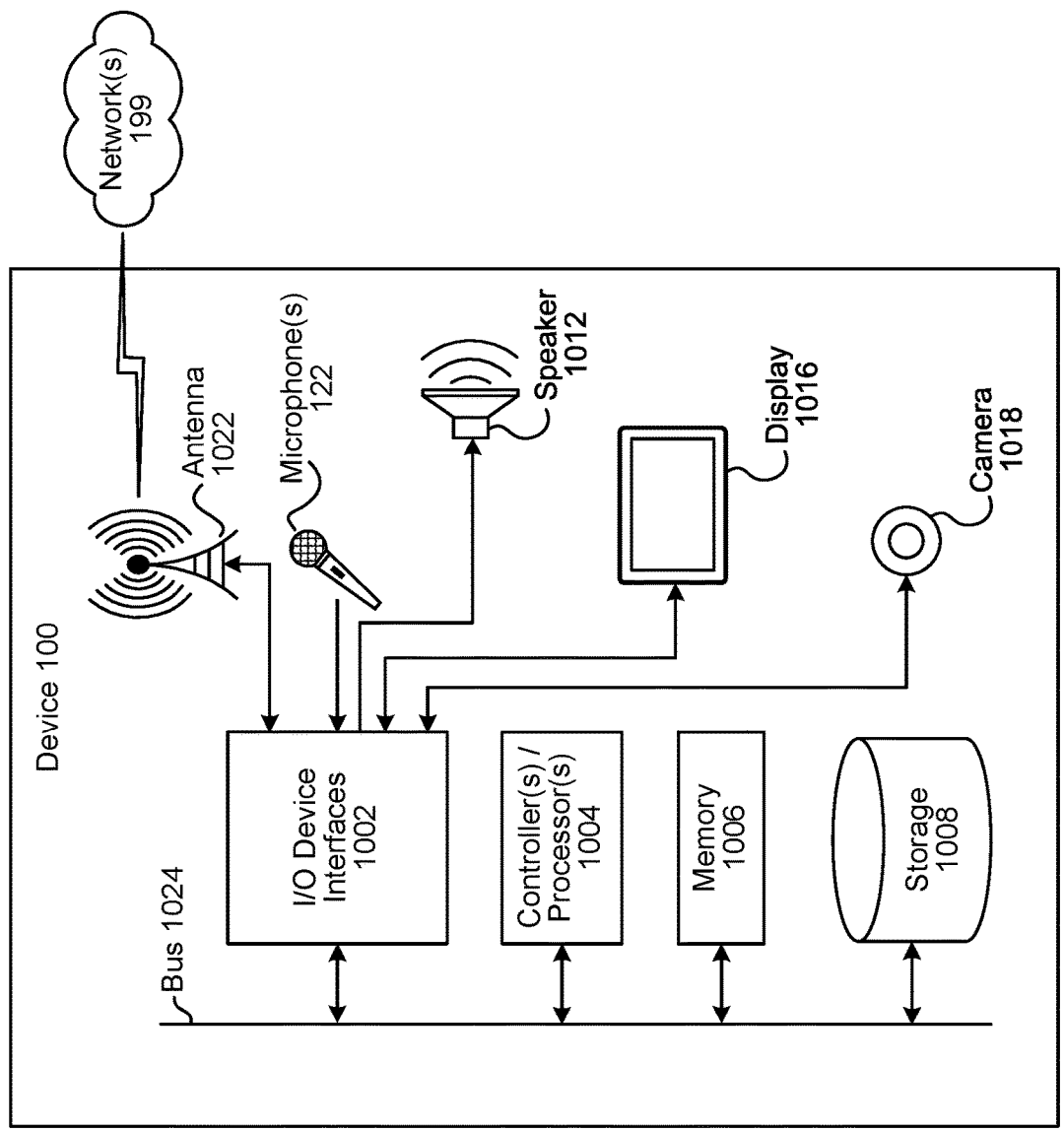
FIG. 10 is a block diagram conceptually illustrating example components of a device, according to embodiments of the present disclosure.
Figure 11:
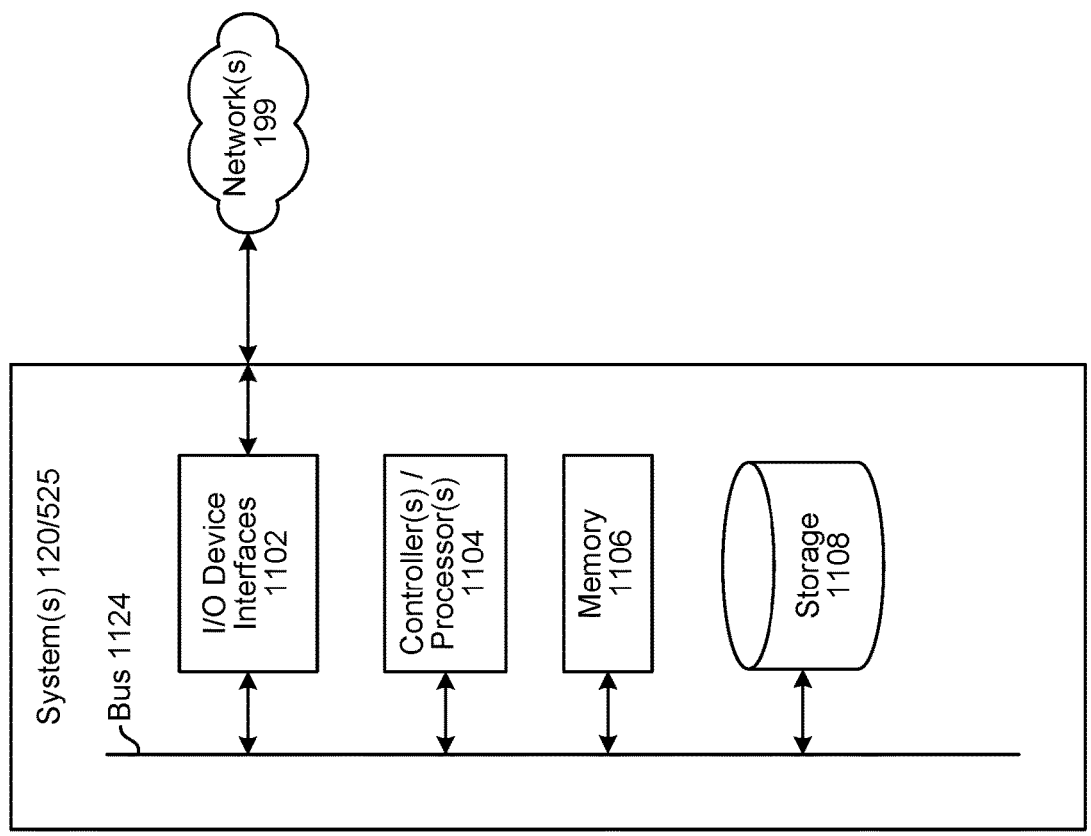
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example components of a remote device, such as the natural language command processing system 120, which may assist with ASR processing, NLU processing, etc., and a skill system 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/525) may be included in the overall system 100 of the present disclosure, such as one or more natural language processing systems 120 for performing ASR processing, one or more natural language processing systems 120 for performing NLU processing, one or more skill systems 525, etc. In operation, each of these systems may include computer-readable and computer-executable instructions that reside on the respective device (120/525), as will be discussed further below.

Each of these devices (110/120/525) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/525) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (1002/1102).

Computer instructions for operating each device (110/120/525) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/525) includes input/output device interfaces (1002/1102). A variety of components may be connected through the input/output device interfaces (1002/1102), as will be discussed further below. Additionally, each device (110/120/525) may include an address/data bus (1024/1124) for conveying data among components of the respective device. Each component within a device (110/120/525) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 122 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system 120, or a skill system 525 may include their own dedicated processors, memory, and/or storage. Alternatively, one or more of the components of the device(s) 110, the natural language command processing system 120, or a skill system 525 may utilize the I/O interfaces (1002/1102), processor(s) (1004/1104), memory (1006/1106), and/or storage (1008/1108) of the device(s) 110, natural language command processing system 120, or the skill system 525, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 525, as described herein, are illustrative, and may be located as a stand-alone device or may be included, in whole or in part, as a component of a larger device or system. As can be appreciated, a number of components may exist either on a system 120 and/or on device 110. For example, language processing components 592 (which may include the ASR component 550), language output components 593 (which may include the NLG component 579 and TTS system 580), etc., for example as illustrated in FIG. 5. Unless expressly noted otherwise, the system version of such components may operate similarly to the device version of such components and thus the description of one version (e.g., the system version or the local version) applies to the description of the other version (e.g., the local version or system version) and vice-versa.

Figure 12:
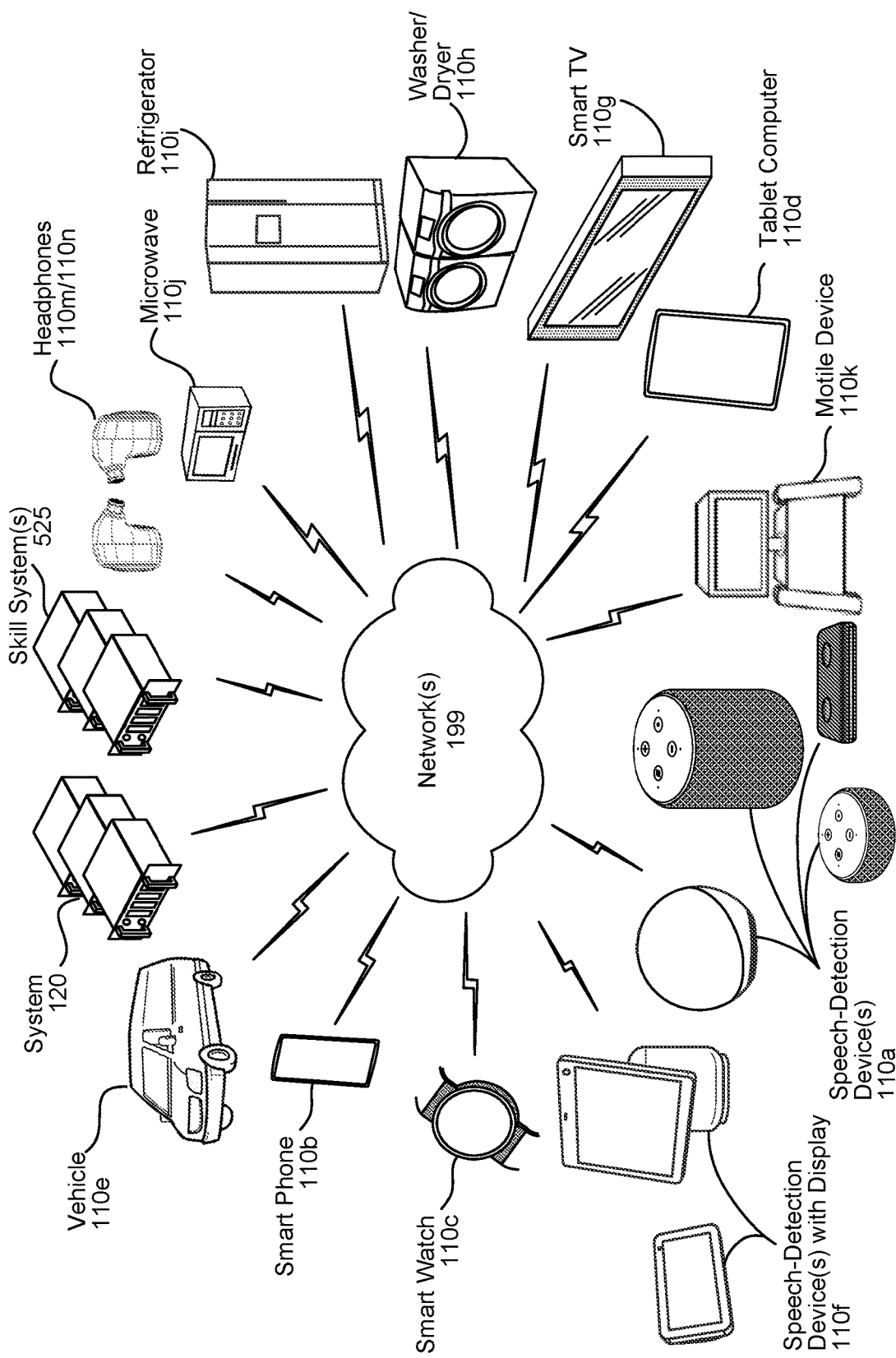
FIG. 12 illustrates an example of a computer network for use with the overall system, according to embodiments of the present disclosure.

As illustrated in FIG. 12, multiple devices (110a-110n, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a voice-activated device 110a, a smart phone 110b, a smart watch 110c, a tablet computer 110d, a vehicle 110e, a voice-activated device with display 110f, a display/smart television 110g, a washer/dryer 110h, a refrigerator 110i, a microwave 110j, autonomously motile device 110k (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, by a system component from a user device separate from the system component, first audio data representing an utterance, wherein the user device receives the first audio data and processes the first audio data using a first neural network model to generate first automatic speech recognition (ASR) data representing a first transcript of the utterance;
    processing the first audio data to determine first feature data, the first feature data representing normalized log-filterbank energies of frames of the first audio data;
    processing, by the system component using a second neural network model different from the first neural network model, the first audio data to determine second ASR data representing a second transcript of the utterance;
    determining, based on at least the second ASR data, to include the first feature data and the second ASR data in a first labeled dataset for updating the first neural network model, the first labeled dataset additionally including second feature data and third ASR data determined using second audio data;
    determining, by the system component using the first labeled dataset and a third neural network model different from the second neural network model, first gradient data representing gradients calculated for updating the third neural network model using the first labeled dataset, the third neural network model representing a duplicate of the first neural network model;
    determining, using the first gradient data, first model update data, the first model update data additionally representing second gradient data determined using a second labeled dataset;
    sending, from the system component to the user device, the first model update data;
    causing the user device to generate an updated first neural network model using the first model update data; and causing the user device to process third audio data, received by the user device, using the updated first neural network model to generate fourth ASR data.

2. The computer-implemented method of claim 1, further comprising:
receiving third data representing a confidence that the second ASR data represents an accurate transcript of the utterance; and
determining that the third data satisfies a condition, wherein determining to include the first feature data and the second ASR data in the first labeled dataset is additionally based on determining that the third data satisfies the condition.

3. The computer-implemented method of claim 1, further comprising:
processing a third labeled dataset using the third neural network model to determine a first word error rate;
determining a fourth neural network model using the third neural network model and the first model update data, the fourth neural network model representing an update of the third neural network model based on the first model update data;
processing the third labeled dataset using the fourth neural network model to determine a second word error rate; and
determining that the second word error rate is less than the first word error rate,
wherein causing the user device to generate the updated first neural network model is based at least in part on determining that the second word error rate is less than the first word error rate.

4. The computer-implemented method of claim 1, wherein the first gradient data is determined using first training parameters, the method further comprising:
determining a fourth neural network model using the third neural network model and the first model update data, the fourth neural network model representing an update of the third neural network model based on the first model update data;
processing a third labeled dataset using the fourth neural network model to determine a first word error rate;
determining, using the first labeled dataset and second training parameters different from the first training parameters, second model update data;
determining a fifth neural network model using the third neural network model and the second model update data, the fifth neural network model representing an update of the third neural network model based on the second model update data;
processing the third labeled dataset using the fifth neural network model to determine a second word error rate; and
determining that the first word error rate is less than the second word error rate,
wherein causing the user device to generate an updated first neural network model using the first model update data is based on determining that the first word error rate is less than the second word error rate.

5. A computer-implemented method comprising:
receiving, by one or more system components from a user device, first audio data representing an utterance captured using a microphone of the user device, wherein the user device processes the first audio data using a first machine learning model to generate first output data representing a first transcript of the utterance;
processing the first audio data using a second machine learning model different from the first machine learning model to determine second output data representing a second transcript of the utterance;
determining, based on at least the second output data, to include the second output data in first data representing a portion of a first labeled dataset for updating the first machine learning model;
determining, by the one or more system components using the first data and a third machine learning model different from the second machine learning model, second data representing first gradients calculated for updating the third machine learning model using the first labeled dataset;
determining, using the second data, first model update data, the first model update data additionally representing second gradients determined using a second labeled dataset;
sending, from the one or more system components to the user device, the first model update data;
causing the user device to generate an updated first machine learning model using the first model update data; and
causing the user device to process second audio data, received by the microphone, using the updated first machine learning model to generate third output data.

6. The computer-implemented method of claim 5, further comprising:
receiving third data representing a confidence that the second output data represents an accurate transcript of the utterance; and
determining that the third data satisfies a condition, wherein determining to include the second output data in the first data is additionally based on determining that the third data satisfies the condition.

7. The computer-implemented method of claim 5, further comprising:
processing a third labeled dataset using the third machine learning model to determine a first performance metric;
determining a fourth machine learning model using the third machine learning model and the first model update data, a fourth machine learning model representing an update of the third machine learning model;
processing the third labeled dataset using the fourth machine learning model to determine a second performance metric; and
determining, using the first performance metric and the second performance metric, to cause the user device to generate an updated first machine learning model using the first model update data.

8. The computer-implemented method of claim 5, wherein the second data is determined using first training parameters, the method further comprising:
determining a fourth machine learning model using the third machine learning model and the second data;
processing a third labeled dataset using the fourth machine learning model to determine a first performance metric;
determining, using the first data and second training parameters different from the first training parameters, third data;
determining a fifth machine learning model using the third machine learning model and the third data;
processing the third labeled dataset using fifth machine learning model to determine a second performance metric; and
determining, using the first performance metric and the second performance metric, to cause the user device to generate an updated first machine learning model using the first model update data.

9. The computer-implemented method of claim 5, further comprising:
identifying a subset of words appearing with less than a threshold frequency in a historical dataset; and
determining that the second transcript indicates one or more words of the subset, wherein including the second output data in the first data is additionally based on determining that the second transcript indicates one or more words of the subset.

10. The computer-implemented method of claim 5, further comprising:
receiving an indication of a semantic tag determined based on processing of the first output data, the semantic tag corresponding to a word in the first transcript; and
determining, based on the indication, that the first transcript is inaccurate with respect to the word, wherein including the second output data in the first data is additionally based on determining that the first transcript is inaccurate with respect to the word.

11. The computer-implemented method of claim 5, further comprising:
receiving an indication that processing of the first output data resulted in an unsuccessful resolution, wherein including the second output data in the first data is additionally based on receiving the indication.

12. The computer-implemented method of claim 5, wherein the first machine learning model has a recurrent neural network transducer (RNN-T) architecture and the second machine learning model has a conformer architecture.

13. A system, comprising:
at least one processor; and
at least one memory comprising instructions that, when executed by the at least one processor, cause the system to:
receive, by the system from a user device, first audio data representing an utterance captured using a microphone of the user device, wherein the user device processes the first audio data using a first machine learning model to generate first output data representing a first transcript of the utterance;
process the first audio data using a second machine learning model different from the first machine learning model to determine second output data representing a second transcript of the utterance;
determine, based on at least the second output data, to include the second output data in first data representing a portion of a first labeled dataset for updating the first machine learning model;
determine, using the first data and a third machine learning model different from the second machine learning model, second data representing first gradients calculated for updating the third machine learning model using the first labeled dataset;
determine, using the second data, first model update data, the first model update data additionally representing second gradients determined using a second labeled dataset;
send, from the system to the user device, the first model update data;
cause the user device to generate an updated first machine learning model using the first model update data; and
cause the user device to process second audio data, received by the microphone, using the updated first machine learning model to generate third output data.

14. The system of claim 13, wherein the user device is a first user device, and the at least one memory further comprises instructions that, when executed by the at least one processor, further cause the system to:
receive third audio data from a second user device different from the first user device, the second user device processing the third audio data using a fourth machine learning model;
process the third audio data using the second machine learning model to determine fourth output data; and
determine the second labeled dataset using the third audio data and the fourth output data.

15. The system of claim 14, wherein the at least one memory further comprises instructions that, when executed by the at least one processor, further cause the system to:
receive third data representing a confidence that the second output data represents an accurate transcript of the utterance; and
determine that the third data satisfies a condition, wherein determining to include the second output data in the first data is additionally based on determining that the third data satisfies the condition.

16. The system of claim 14, wherein the at least one memory further comprises instructions that, when executed by the at least one processor, further cause the system to:
process a third labeled dataset using the third machine learning model to determine a first performance metric;
determine a fourth machine learning model using the third machine learning model and the first model update data, a fourth machine learning model representing an update of the third machine learning model;
process the third labeled dataset using the fourth machine learning model to determine a second performance metric; and
determine, using the first performance metric and the second performance metric, to cause the user device to generate an updated first machine learning model using the first model update data.

17. The system of claim 14, wherein the second data is determined using first training parameters, and the at least one memory further comprises instructions that, when executed by the at least one processor, further cause the system to:
determine a fourth machine learning model using the third machine learning model and the second data;
process a third labeled dataset using the fourth machine learning model to determine a first performance metric;
determine, using the first data and second training parameters different from the first training parameters, third data;
determine a fifth machine learning model using the third machine learning model and the third data;
process the third labeled dataset using fifth machine learning model to determine a second performance metric; and
determine, using the first performance metric and the second performance metric, to cause the user device to generate an updated first machine learning model using the first model update data.

18. The system of claim 14, wherein the at least one memory further comprises instructions that, when executed by the at least one processor, further cause the system to:

identify a subset of words appearing with less than a threshold frequency in a historical dataset; and determine that the second transcript indicates one or more words of the subset, wherein including the second output data in the first data is additionally based on determining that the second transcript indicates one or more words of the subset.

19. The system of claim 14, wherein the at least one memory further comprises instructions that, when executed by the at least one processor, further cause the system to:

receive an indication of a semantic tag determined based on processing of the first output data, the semantic tag corresponding to a word in the first transcript; and determine, based on the indication, that the first transcript is inaccurate with respect to the word, wherein including the second output data in the first data is additionally based on determining that the first transcript is inaccurate with respect to the word.

20. The system of claim 14, wherein the at least one memory further comprises instructions that, when executed by the at least one processor, further cause the system to:

receive an indication that processing of the first output data resulted in an unsuccessful resolution, wherein including the second output data in the first data is additionally based on receiving the indication.

21. The system of claim 14, wherein the first machine learning model has a recurrent neural network transducer (RNN-T) architecture and the second machine learning model has a conformer architecture.

22. The computer-implemented method of claim 5, wherein the user device is a first user device, the method further comprising:

receiving third audio data from a second user device different from the first user device, the second user device processing the third audio data using a fourth machine learning model;

processing the third audio data using the second machine learning model to determine fourth output data; and determining the second labeled dataset using the third audio data and the fourth output data.

* * * * *